United States Patent [19]
Sato et al.

[11] Patent Number: 5,805,797
[45] Date of Patent: Sep. 8, 1998

[54] CONTROLLER HAVING A FAIL SAFE FUNCTION, AUTOMATIC TRAIN CONTROLLER AND SYSTEM USING THE SAME

[75] Inventors: Hiroshi Sato, Hitachinaka; Nobuyasu Kanekawa, Hitachi; Makoto Nohmi, Hitachinaka; Korefumi Tashiro, Hitachi, all of Japan

[73] Assignee: Hitachi, Ltd., Tokyo, Japan

[21] Appl. No.: 580,336

[22] Filed: Dec. 28, 1995

[30] Foreign Application Priority Data

Dec. 28, 1994 [JP] Japan .................................. 6-326645
Jul. 20, 1995 [JP] Japan .................................. 7-183803

[51] Int. Cl.$^6$ ............................................... G06F 11/00
[52] U.S. Cl. ..................................... 395/185.01; 371/68.1
[58] Field of Search ........................... 395/180, 182.01, 395/182.08, 182.09, 185.01, 185.02; 364/228.3, 229, 229.3; 371/37.7, 67.1, 68.1, 48

[56] References Cited

U.S. PATENT DOCUMENTS

| | | | |
|---|---|---|---|
| 3,444,528 | 5/1969 | Lovell et al. ..................... | 395/182.09 |
| 4,610,013 | 9/1986 | Long et al. ....................... | 395/182.09 |
| 4,622,667 | 11/1986 | Yount ................................ | 395/182.09 |
| 4,882,731 | 11/1989 | Van Gils .......................... | 395/182.08 |
| 5,202,822 | 4/1993 | McLaughlin et al. ............. | 395/182.09 |
| 5,600,786 | 2/1997 | Baker et al. ....................... | 395/182.09 |

FOREIGN PATENT DOCUMENTS 57-62702  4/1982  Japan  .............................. B60L 15/20

*Primary Examiner*—Albert Decady
*Attorney, Agent, or Firm*—Antonelli, Terry, Stout & Kraus, LLP

[57] ABSTRACT

An ATP device generates control data for two systems from an ATP command speed signal, provides duplicate logic units in the ATP device so as to process the respective control data, provides at least two CRC data for checking the control data for each system, and changes the CRC data of the opposite logic unit or selects one of the two according to the content of a failure detection signal from each of the duplicated logic units. It is possible to check the control data and the operation of each logic circuit in such a way that only when all the data, circuits, and elements operate normally will an output signal for controlling the object to be controlled be outputted, and when a failure is detected in a part, an output signal to that effect is outputted. Therefore, when a failure occurs, a fail safe function for performing control on the safe side is made possible.

37 Claims, 24 Drawing Sheets

CONTROLLER HAVING A FAIL SAFE FUNCTION, AUTOMATIC TRAIN CONTROLLER AND SYSTEM USING THE SAME

BACKGROUND OF THE INVENTION

The present invention relates to a circuit having a fail safe function and a controller and system using it, and more particularly to train control systems, such as an ATP (automatic train protection) device, having a fail safe function suited to a train maintenance system, an ATS (automatic train stop) device, and an ATO (automatic train operation) device, and a controller and system using them.

As electronic technology has developed recently, advanced and complicated control systems have been required to improve the energy (fuel) efficiency, operability, comfortability of ride and safety, and to increase the speed in transport facilities, such as an airplane, a train and an automobile.

On the other hand, a safety operation is necessary in such transport facilities, and the reliability and fail safe condition (when a failure occurs, it is necessary that no output is routed from the dangerous side) of a controller are strongly required.

For example, the safety of train operation is ensured by a superior maintenance system, such as an ATC (automatic train control) device and an ATS device.

As exemplified by the ATP device used in the maintenance system of super-express trains, the reliability and fail safe operation provided by such devices are appreciated both at home and abroad. An ATP device and an ATS device of the type used in those trains comprise a control circuit and relay including LSIs having a self check function. The main signal used in those devices is a frequency signal in which the logical level is changed to H or L alternately (hereinafter referred to as an alternating signal). The control circuit compares and processes an ATP speed command signal determined from the ground speed and an actual speed signal of a train when it receives this ATP signal, controls the braking force in response to a speed control signal, that is, a brake command signal based on a difference between the ATC signal and the actual speed signal, and thereby controls the speed of the train. A device for generating such an alternating signal is described in Japanese Patent Application Laid-Open 57-62702.

Lately, a system for transferring information concerning train operation (for example, the speed and position of a train) between the control command center and a train and for exchanging information between trains is under consideration so as to improve the transport services, and control of a higher density train operation and a higher speed train operation are being sought.

To respond to these objectives, recognizing that the controller in use at present and LSIs used for it alone are deficient processing speed and data storage capacity, to make up for such deficiencies, it becomes necessary to add many peripheral circuits, and hence the controller becomes complicated.

Since the technology of semiconductors has made remarkable progress recently, and since high integration and high speed have been realized, a control circuit having various functions can comprise a one chip LSI. However, in an LSI structured like this, there is a problem imposed in that a wrong control signal due to mixed contact between the conductors formed inside it may be outputted, or a signal induced via a stray capacity between a disconnected conductor and its adjacent conductor may be outputted, so that a control signal which appears to be normal may be outputted even though the LSI itself is damaged. Furthermore, the use environment of an LSI for train control is extremely severe compared with that of an LSI for general use.

A serious problem arises in that, when a wrong signal is outputted due to internal mixed contact or disconnection during manufacture of an LSI, or due to internal mixed contact or disconnection during use, or when a brake command signal which is a main factor in speed control is not outputted, a serious accident may be caused.

SUMMARY OF THE INVENTION

It is necessary that an LSI corresponding to various future controls be provided as a control circuit which satisfies the functions corresponding to those controls, provides an improved self check function for detecting a failure of the LSI itself, and satisfies a fail safe control for controlling with a safety margin when an error occurs.

Therefore, an object of the present invention is to provide a control circuit which has an improved self check function for detecting a failure of a controller and a fail safe function for controlling with a safety margin when an error occurs, and a controller and a system using the controller.

The present invention comprises a command speed frequency conversion device for converting an ATP command speed signal to a frequency; a first data conversion device for converting an output signal of the command speed frequency conversion device to digital data; a speed frequency conversion device for converting an actual speed of an electric motor vehicle to a frequency; a second data conversion device for converting an output signal of the speed frequency conversion device to digital data; a brake command output device for outputting a brake command signal according to a deviation between the output data of the first data conversion device and the output data of the second data conversion device; a device for duplicating the brake command output device in a system A and a system B inside an LSI; a device for inputting first data corresponding to an ATC command speed signal and second data corresponding to an actual speed of an electric motor vehicle to circuits of the system A and the system B of the duplicated LSI at the same time; a device for generating first control data in which CRC data when a generation polynomial expression assumed as G0(X) is added on the basis of the first data and second control data in which CRC data when a generation polynomial expression assumed as G1(X) is added; a switching device for selecting one of the first control data and the second control data, a means for checking an error of an output signal of the switching device by using a first failure detector corresponding to the generation polynomial expression G0(X) which is connected in parallel and a second failure detector corresponding to the generation polynomial expression G1(X); a comparator for comparing an output of the first failure detector of the system A and an output of the second failure detector; a comparator for comparing an output of the first failure detector of the system B and an output of the second failure detector; a means for controlling the switching device of the system B by an output signal of the comparator of the system A and selecting the first control data or the second control data; a sign inversion device for inverting the sign of an output signal of the comparator of the system B, and; a device for controlling the switching device of the system A by an output signal of the sign inversion device of the system B and selecting the first control data or the second control data.

Furthermore, the present invention calls for arranging and wiring the system A and the system B of the duplicated circuit away from each other and widening the arrangement interval of an output signal of the comparator of the system A and an output signal of the comparator of the system B and the conductor interval.

When the first control data of the system A and the system B are decided as normal by the first failure detector, output signals thereof are L (low level); whereas, when they are decided as abnormal by the second failure detector, output signals thereof are H (high level). When the second control data are decided as abnormal by the first failure detector, output signals thereof are H; whereas, they are decided as normal by the second failure detector, output signals thereof are L.

At the start of operation, the first control data is selected in the system A and the second control data is selected in the system B. Therefore, the first control data of the system A is checked by the first failure detector and the second failure detector, and the output signal L of the first failure detector and the output signal H of the second failure detector are compared by the comparator of the system A, and; the switching device of the system B is controlled by a comparison output signal H obtained under this condition, so that the second control data is switched to the first control data.

When the second control data is switched to the first control data, the output signal L of the first failure detector and the output signal H of the second failure detector are compared by the comparator of the system B, and a comparison output signal H obtained under this condition is inverted in sign by the sign inversion device and goes to L, and; the switching device of the system A is controlled, so that the first control data is switched to the second control data. When the first control data is switched to the second control data, the output signal H of the first failure detector and the output signal L of the second failure detector are compared by the comparator of the system A, and; the switching device of the system B is controlled by a comparison output signal L obtained under this condition, so that the first control data is switched to the second control data.

When the first control data is switched to the second control data, the output signal H of the first failure detector and the output signal L of the second failure detector are compared by the comparator of the system B, and a comparison output signal L obtained under this condition is inverted in sign by the sign inversion device and goes to H; and the switching device of the system A is controlled, so that the second control data is switched to the first control data. When the second control data is switched to the first control data, the output signal L of the first failure detector and the output signal H of the second failure detector are compared by the comparator of the system A; and the switching device of the system B is controlled by a comparison output signal H obtained under this condition, so that the second control data is switched to the first control data.

When the second control data is switched to the first control data, the output signal L of the first failure detector and the output signal H of the second failure detector are compared by the comparison means of the system B, and a comparison output signal H obtained under this condition is inverted in sign by the sign inversion means and goes to L; and the switching device of the system A is controlled, so that the second control data is switched to the first control data.

As mentioned above, using a signal obtained by the operation of its own system, the switching device of the opposite system is controlled. Therefore, when the control data, the failure detector, the comparators, and the switching devices are normal, output signals of the switching devices of the system A and the system B operate in an alternating manner with a fixed period. However, when one of them breaks down, alternating signals of the switching device of the system A and the system B are stopped.

The alternating of signals of the switching device is monitored. When the system A and the system B of the duplicated circuit are arranged and wired separately from each other and the arrangement interval of another comparator for comparing an output signal of the comparator of the system A and an output signal of the comparator of the system B and the conductor interval are widened, for example, a failure of the system A can be prevented from affecting the system B, failed systems can be prevented from operating as if they are normal, and a situation can be prevented in which a brake command signal to be outputted is not outputted and in which a brake command signal which is not required to be outputted is outputted.

BRIEF DESCRIPTION OF THE DRAWINGS

Other objects and aspects of the invention will become apparent from the following description of various embodiments with reference to the accompanying drawings in which.

PREFERRED EMBODIMENTS

A case wherein the present invention is applied to an automatic train controller ATP will be explained hereunder.

The ATP controls the braking force applied to a train according to the deviation between an ATP command speed signal sent to the train and the running speed of the train (hereinafter referred to as an electric motor vehicle) at that time and controls the running speed of the electric motor vehicle to a value less than the command speed.

Figure 1:
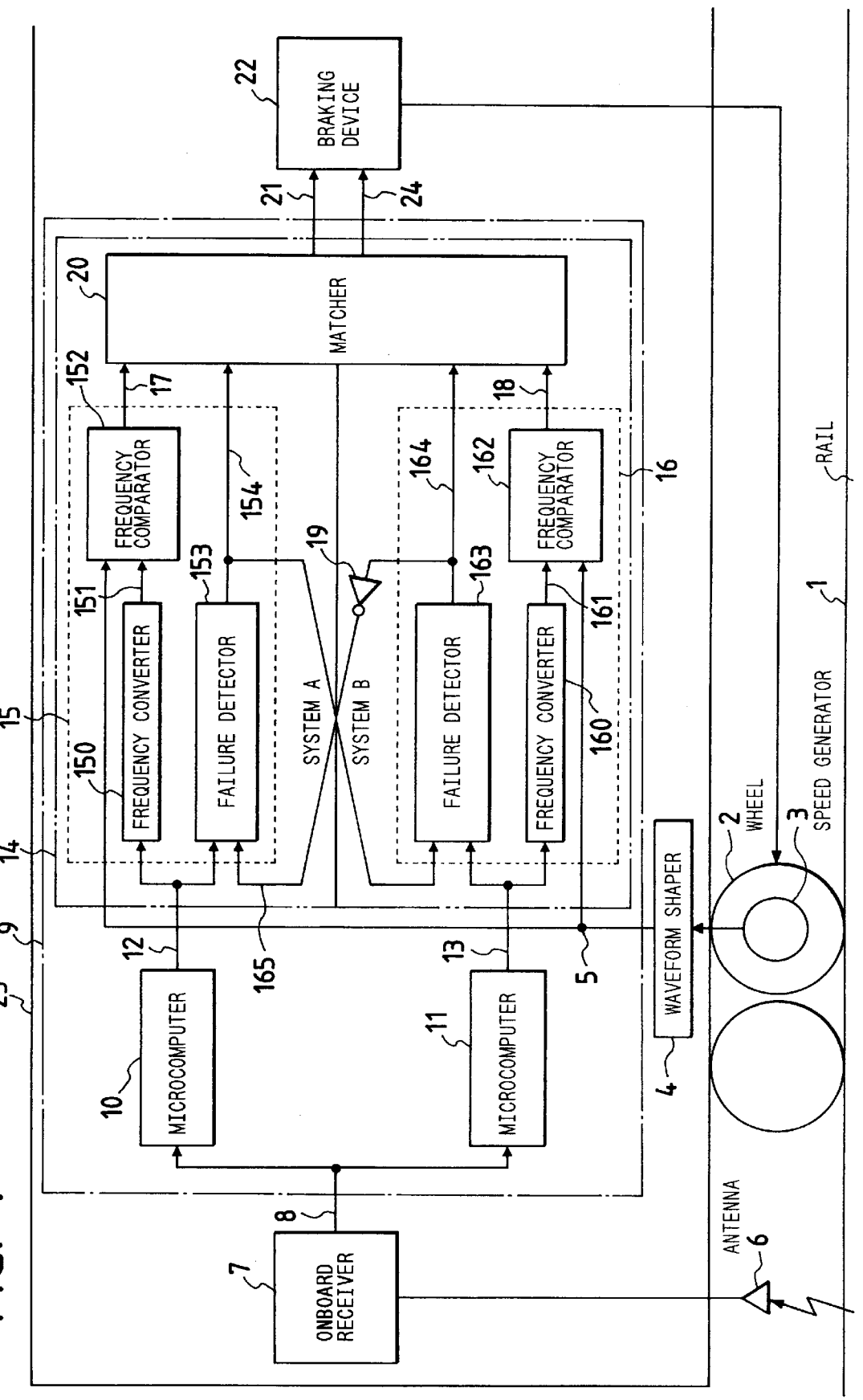
FIG. 1 is a schematic diagram of an embodiment of the present invention.

FIG. 1 is a block diagram of an ATP system using the present invention.

In FIG. 1, numeral 1 indicates a rail on which an electric motor vehicle runs, 23 denotes a body of the electric motor vehicle, 2 denotes a wheel of the electric motor vehicle, 3 denotes a speed generator attached to the shaft of the wheel 2 for detecting the speed of the shaft, 4 denotes a waveform shaper (or a signal converter) for shaping the waveform of an output voltage from the speed generator 3 and for outputting a speed frequency signal 5 in proportion to the speed of the electric motor vehicle, 6 denotes an antenna for receiving a frequency-modulated ATP command speed signal from the rail, 7 denotes an onboard car receiver for demodulating the frequency-modulated ATP command speed signal received by the antenna 6 and for shaping and amplifying the waveform, 8 denotes an ATP command speed signal which is an output signal of the onboard receiver 7, 9 denotes an ATP device for controlling the speed of the electric motor vehicle from the ATP command speed signal and an actual speed of the electric motor vehicle, and 22 denotes a braking device for receiving a brake command signal 21 from the ATP device and for applying an actual braking force to a wheel of the electric motor vehicle.

By using this arrangement, the speed of the electric motor vehicle is controlled so as to eliminate the deviation between the ATP command speed and the actual speed of the electric motor vehicle or to prevent the actual speed of the electric motor vehicle from exceeding the ATP command speed.

Figure 2:
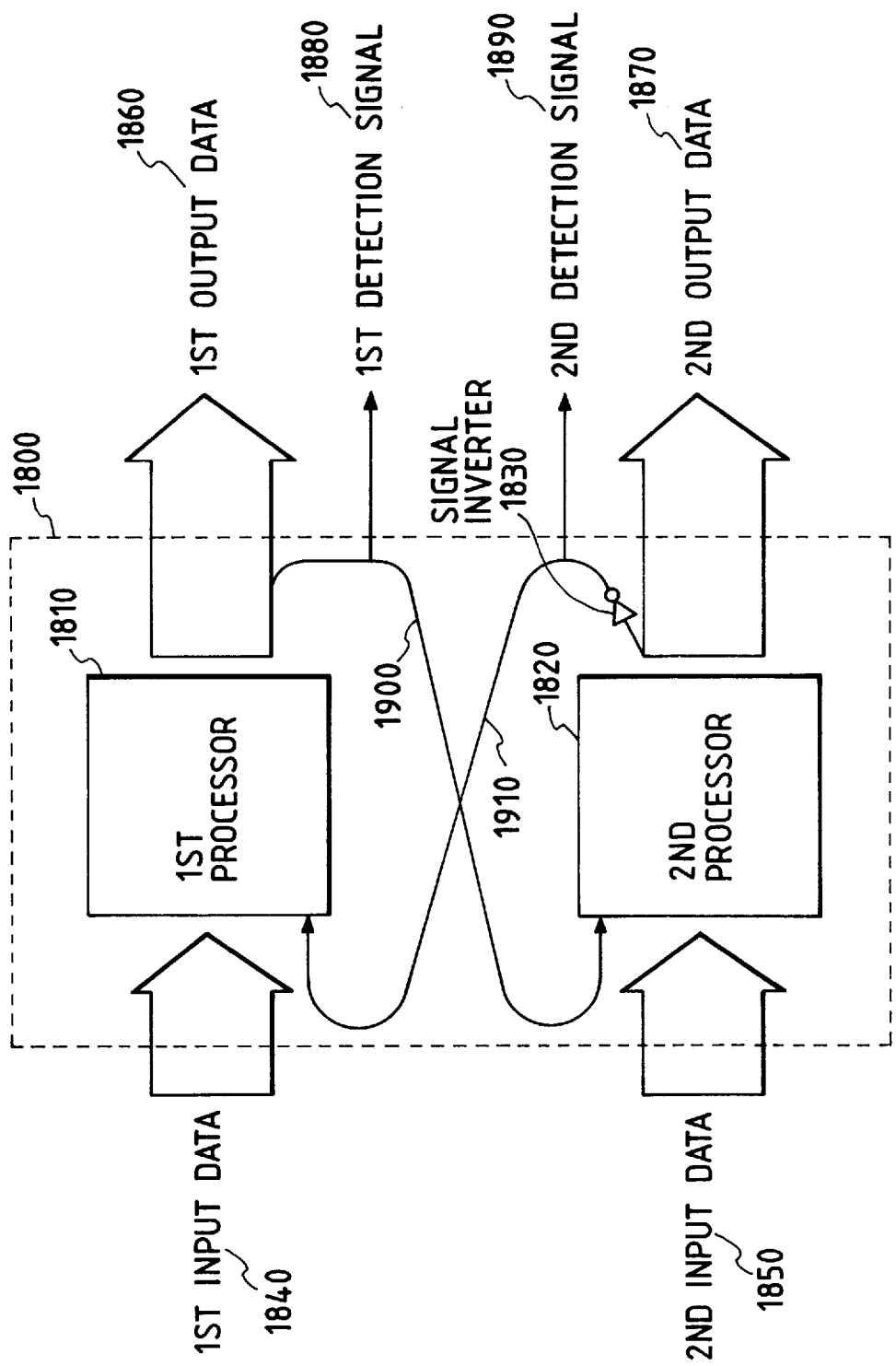
FIG. 2 is a block diagram of an embodiment of the controller of the present invention.

The fail safe technology of the controller of the aforementioned ATP device will be explained hereunder by referring to FIG. 2. Numeral 1800 indicates a controller, which includes a first processor 1810 which receives and processes first input data and outputs first output data 1860 and a first detection signal 1880, a second processor 1820 which reserves and processes second input data and outputs second output data 1870 and a second detection signal 1890 which is inverted in sign, a signal inverter 1830 for inverting the detection signal processed by the second processor, a first connector 1900 for supplying the first detection signal 1880 outputted from the first processor 1810 to the second processor 1820, and a second connector 1910 for supplying the second detection signal 1890 outputted from the second processor via the signal inverter 1830 to the first processor 1810.

The first input data and the second input data are data which are generated and supplied by a microcomputer or read from a memory. As to the first input data, there are cases in which there is data for processing first output data and check data for checking the above data and cases in which there is no check data, and check data is generated by processing performed in the first processor, whereby a first detection signal is generated. As to the second input data, there are cases in which the content of the data is the same as that of the first input data and in which the content is different from that of the first input data. As to the second input data, there are cases in which there is check data similar to the aforementioned first input data and cases in which there is no check data. When the second input data has no check data, there are cases in which check data is generated by the second processor in the same way as with the aforementioned first input data and cases in which no check data is generated even by the second processor.

Furthermore, in this embodiment, the first input data and the second input data are independent of each other. However, the same input data can be easily inputted to two processors. The first processor and the second processor process the first or second input data which is sequentially inputted by a serial processing type ring processor or they fetch both data in a microcomputer in parallel and perform parallel processing.

First and second detection signals indicate whether the first processor and the second processor operate normally or abnormally. When alternating signals in a predetermined period are outputted, the detection signals indicate that the processors are operating normally. These detection signals can be used also as a detection signal for indicating whether the check results of the contents of input data are correct or wrong. Another device is controlled by the first output data and the second output data. Before outputting data to another device, using an output portion for detecting a match in the first output data and the second output data or outputting final output data using the first or second detection signal, another device to be controlled is controlled.

The processing of a controller having the aforementioned constitution will now be described. The first example of the processing is a case of outputting the first detection signal first and generating alternating signals by repeating inversion of this signal.

The first input data is inputted and processed by the first processor, and the first output data and the first detection signal are outputted. The first detection signal is inputted to the second processor and processed together with the second input data, and the second output data and the second detection signal are generated and outputted.

The second detection signal is inverted in sign by the signal inverter 1830 and inputted to the first processor. When the first detection signal processed by the first processor is a high (hereinafter referred to as H) level signal, the second detection signal processed by the second processor also becomes an H-level signal, and when the first detection signal of the first processor is a low (hereinafter referred to as L) level signal, the second detection signal processed by the second processor also becomes an L level signal.

The second detection signal of H level is inverted in sign by the signal inverter and the detection signal of L level is inputted to the first processor. Therefore, when the first detection signal processed by the first processor is an L-level signal, the L-level signal is inputted to the second processor and the detection signal of the second processor becomes an L-level signal. However, since the signal is inverted in sign by the signal inverter, the second detection signal of H level is inputted to the first processor and when the first processor and the second processor operate normally, the first and second detection signals become signals alternating to the H, L, H, - - - levels.

The aforementioned processing of the detection signal in the first or second processor results in output of a signal having the same level as the inputted level. Namely, when the first detection signal of H or L level is outputted from the first processor first, the first and second detection signals become alternating signals thereafter as long as the first and second processors operate normally.

The second example of the processing is a case of implementing logic being provided between the first detection signal outputted from the first processor and the check data of the second input data (or the check data generated from the second input data) and outputting a detection signal from the second processor. By doing this, the present invention not only makes it possible to detect whether the first or second processor operates normally or abnormally, but also make it possible to check whether the first or second input data is normal or abnormal.

Namely, when the first detection signal does not match the check data of the second input data, a signal of a different level from that of the first detection signal is outputted from the second processor as a detection signal. By doing this, the second detection signal via the signal inverter becomes a signal of the same level as that of the first detection signal, so that no alternating signal is outputted. The same may be said with the second detection signal of the first processor and the check data of the first input data. In the case of this processing, a logic unit for implementing logic in the processor is used.

Next, the details of the ATP device 9 shown in FIG. 1, which has the aforementioned characteristics of a controller in an automatic train control system, will be described.

The ATP device 9 comprises a first microcomputer 10 for converting the ATP command speed signal 8 to control data 12 of the first microcomputer, a second microcomputer 11 for converting the ATP command speed signal 8 to control data 13 of the second microcomputer by performing the same process as that for the first microcomputer, and a controller 14 which processes the control data 12, 13 using duplicated logic. The controller 14 comprises a logic circuit 15 of the system A for implementing logic between the control data 12 of the first microcomputer 10 and a speed frequency signal 5 and outputting an A system logic output signal 17, a logic circuit 16 of the system B for implementing logic between the control data 13 of the second microcomputer 11 and the speed frequency signal 5 and outputting a B system logic output signal 18.

The logic circuit 15 of the system A comprises a frequency converter 150 for converting the control data 12 of the first microcomputer to an ATP command speed frequency (signal) 151, a frequency comparator 152 for comparing the ATP command speed frequency 151 and the speed frequency 5 and a failure detector 153 for checking the content of the control data 12 of the first microcomputer and the status of the logic circuit 15 on the basis of a failure detection signal from the system B and for outputting an A system failure detection signal 154.

The logic circuit 16 of the system B comprises a frequency converter 160 for converting the control data 13 of the second microcomputer to an ATP command speed frequency (signal) 161, a frequency comparator 162 for comparing the ATP command speed frequency 161 and the speed frequency 5, and the failure detector 163 for checking the content of the control data 13 of the second microcomputer and the status of the logic circuit 16 on the basis of a failure detection signal from the system A and for outputting a B system failure detection signal 164.

Numeral 19 indicates a logic circuit for generating a sign inversion signal 165 for inverting the sign of the B system failure detection signal 164 and for inputting it to the failure detector 153 of the system A. For example, the logic circuit may simply be an inverter circuit. This sign inversion logic circuit 19 is connected between the output side of the failure detector 163 of the system B and the input side of the failure detector 153 of the system A. However, the sign of the failure detection signal 154 of the system A may be inverted.

The ATP command speed signal represents a limit speed which is preset according to the travelling condition and other factors and flows through the rail 1 as a frequency-modulated signal. This ATP command speed signal is received by the receiving antenna 6 of a running electric motor vehicle and is demodulated, amplified, and shaped at the same time by the car receiver 7, and is then detected. The speed frequency signal 5, which is in proportion to the speed of the electric motor vehicle, is detected by shaping the output voltage of the speed generator 3 directly connected to the axle of the electric motor vehicle using the waveform shaper 4.

The ATP command speed signal 8 of the car receiver 7 is inputted to the first microcomputer 10 and the second microcomputer 11 of the ATP device 9, respectively, and is converted to control data or processed. Namely, assuming that the data corresponding to the ATP command speed signal is one word in length, n kinds of ATP command speed signals are converted to data of n words. Control data generated by conversion or processing using the microcomputers 10 and 11 is stored in the memory built in the microcomputers 10 and 11 and outputted as control data 12 and 13 sequentially. The memory retaining the control data 12 and 13 may be the memories built in the microcomputers 10 and 11, or the memories or microcomputers (not shown in the drawing) built in the logical circuit 15 and the logical circuit 16, or a memory installed independently of the ATP device. A single memory or different memories may retain the control data 12 and 13. FIG. 1 shows an example in which the above memory is built in each microcomputer. Each of these memories may be a storage device including a cache memory.

Figure 3:
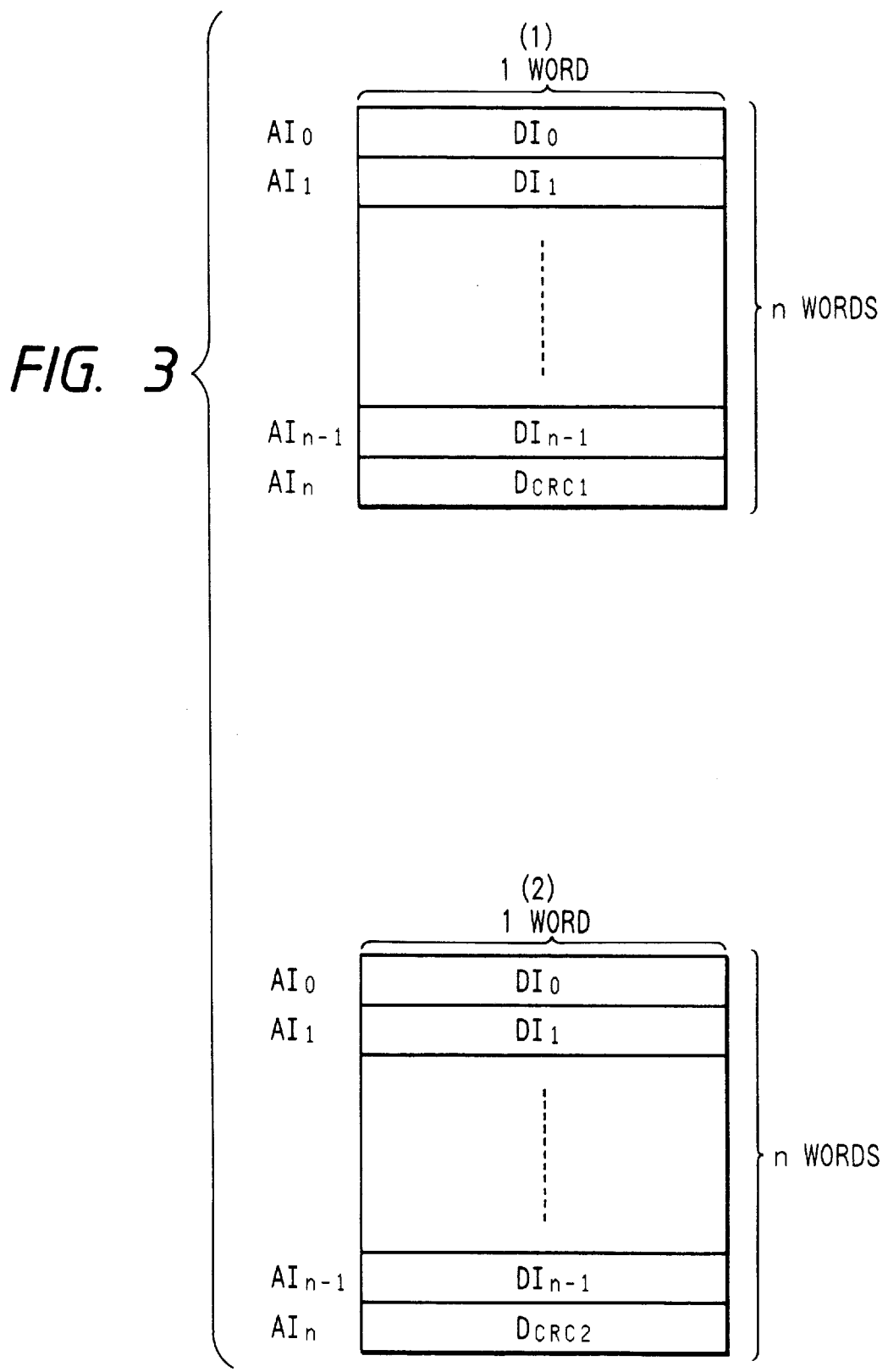
FIG. 3 is a data configuration diagram.

The data configuration (1) shown in FIG. 3 is generated by the first microcomputer 10 and shows data $DI_0$ to $DI_{n-1}$ stored at the addresses $AI_0$ to $AI_{N-1}$ of the memory. In the same way, the data configuration (2) shown in FIG. 3 is generated by the second microcomputer 11 and shows data $DI_0$ to $DI_{n-1}$ stored at the addresses $AI_0$ to $AI_{n-1}$ of the memory.

At the end of the data $DI_0$ to $DI_{n-1}$ of the first microcomputer 10, CRC data $D_{CRC1}$ of one word in length is added for detection of a failure. The low-order bits to the high-order bits of the data $DI_0$ to $DI_{n-1}$ and $D_{CRC1}$ at the addresses $AI_0$ to $AI$, are outputted serially. The outputted serial data is inputted to the logic circuit 15 of the system A as the control data 12 of the first microcomputer.

In the same way, at the end of the data $DI_0$ to $DI_{n-1}$ of the second microcomputer 11, CRC data $D_{CRC2}$ of one word in length is added for detection of a failure. The low-order bits to the high-order bits of the data $DI_0$ to $DI_{n-1}$ and $D_{CRC2}$ at the addresses $AI_0$ to $AI_n$ are outputted serially. The outputted serial data is inputted to the logic circuit 16 of the system B as the control data 13 of the second microcomputer. In this case, it is desirable that the data $DI_0$ to $DI_{n-1}$ is the same in both of the systems A and B and this embodiment shows a case where the data is the same.

In the logic circuit 15 of the system A, the control data 12 is converted to n kinds of ATP command speed frequencies 151 according to the ATP command speed signals by the serial operation type frequency converter 150 (a ring arithmetic circuit described later) and os outputted serially. The serially outputted signals are inputted to the frequency comparator 152 (described later).

In the same way, in the logic circuit 16 of the system B, the control data 13 is converted to n kinds of ATP command speed frequencies 161 according to the ATP command speed signals by the serial operation type frequency converter 160 (a ring arithmetic circuit described later) and is outputted serially. The serially outputted signals are inputted to the frequency comparator 162 (described later).

In this case, $D_{CRC1}$ of the system A and $D_{CRC2}$ of the system B have CRC data generated by at least two different generation polynomial expressions, respectively, that is, $D_{CRC10}$ and $D_{CRC11}$ for the system A and $D_{CRC20}$ and $D_{CRC21}$ for the system B. As to these CRC data, two CRC data may be generated from one CRC data. These CRC data are not frequency-converted by the frequency converters 150 and 160.

The speed frequency 5 is inputted to the frequency comparator 152 of the system A and is compared with the ATP command speed frequency 151 and the comparison result is outputted serially as the output signal 17. In the same way, the speed frequency 5 is inputted to the frequency comparator 162 of the system B and is compared with the ATP command speed frequency 161 and the comparison result is outputted serially as the output signal 18. The matcher 20 compares and correlates the output signal 17 of the logic circuit 15 and the output signal 18 of the logic circuit 16 and outputs a matched signal to the braking device 22 as the brake command 21.

Figure 4:
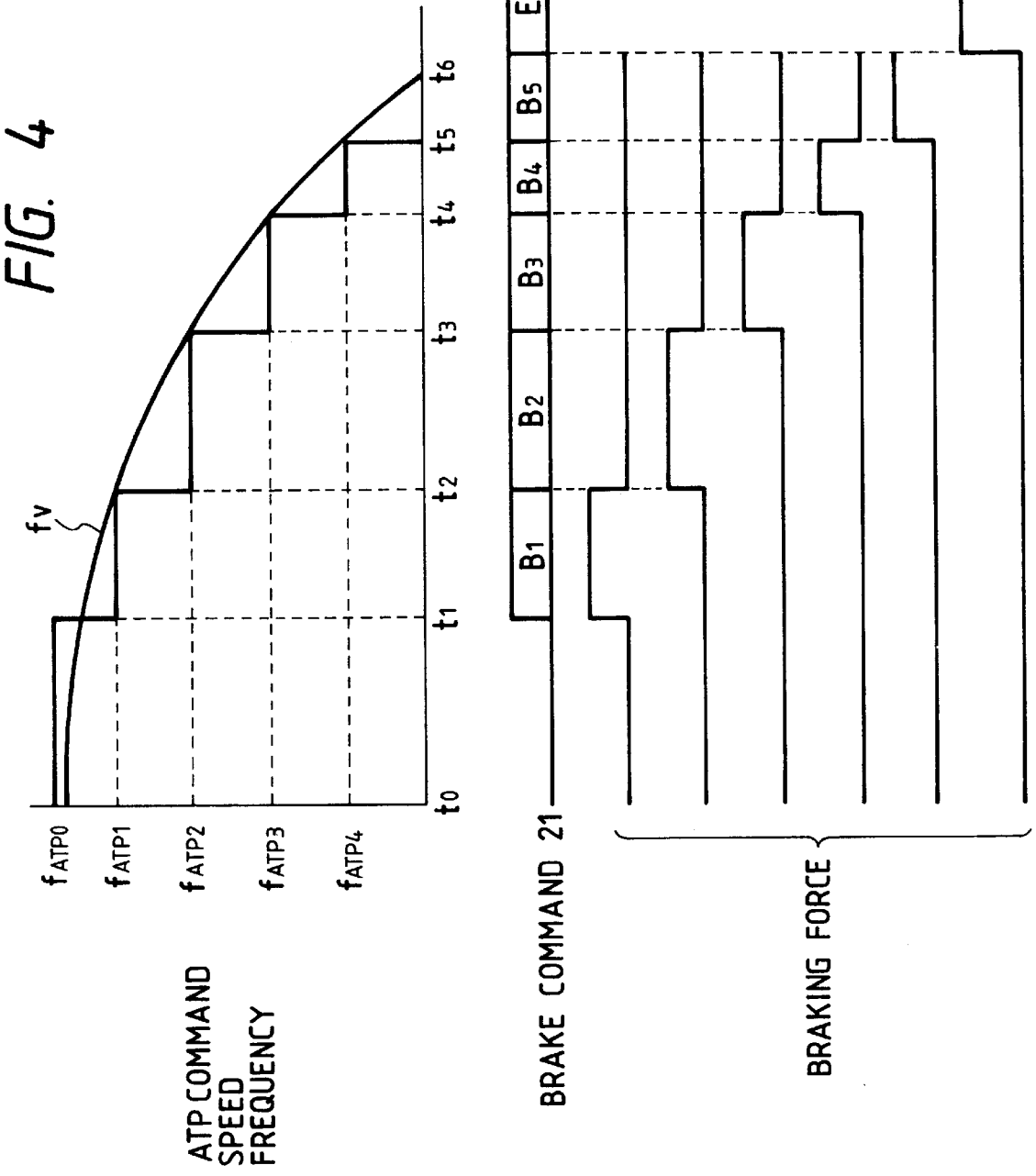
FIG. 4 is a waveform timing diagram of a frequency comparison operation.

FIG. 4 shows a conceptual diagram of the frequency comparison operation when an electric motor vehicle stops at a predetermined position, and the relation between the ATP command speed frequency, the speed frequency of the electric motor vehicle, and the brake command will be explained.

In FIG. 4, the axis of ordinate indicates the ATP command speed frequency $f_{ATP}$, and the axis of abscissa indicates the time t, and a symbol $f_v$ indicates the speed frequency of the electric motor vehicle.

The relation between the ATP command speed frequency $f_{ATP0}$ and the speed frequency $f_v$ of the electric motor vehicle at the time $t_0$ is $f_{ATP0} > f_v$. During the period from the time $t_0$ to $t_1$, neither the running command nor the brake command are given to the electric motor vehicle and the electric motor vehicle is in a state wherein it starts deceleration by coasting.

Assuming that the ATP command speed frequency $f_{ATP0}$ is changed to $f_{ATP1}$ at the time $t_1$ in this state, $f_{ATP1}$ becomes lower than $f_v$, so that $B_1$ shown in the drawing is outputted from the matcher 20 as the brake command signal 21 and is supplied to the braking device 22. The braking force corresponding to the command is given to the electric motor vehicle from the braking device 22 and the electric motor vehicle starts deceleration.

Assuming that the ATP command speed frequency $f_{ATP1}$ is changed to $f_{ATP2}$ at the time $t_2$, $f_{ATP2}$ becomes lower than $f_v$, so that the brake command signal 21 of the matcher 20 becomes $B_2$ as shown in the drawing and the electric motor vehicle decelerates further.

Assuming that the ATP command speed frequency is changed to $f_{ATP3}$ to $f_{ATP5}$ at the time $t_3$ to $t_5$ in the same way, signals $B_3$ to $B_5$ as shown in the drawing are outputted serially as the brake command signal 21 of the matcher 20. This brake command signal 21 is inputted to the braking device 22 and the braking device 22 applies a predetermined braking force to the electric motor vehicle.

In FIG. 1, the brake command signals 21 of duration $B_1$ to $B_5$ are outputted serially from the matcher 20, as shown in FIG. 3, so that the braking device 22 decodes them and the braking device 22 is controlled so that the braking forces shown in FIG. 4 are applied.

As mentioned above, the ATP device is a maintenance device for applying a braking force to an electric motor vehicle in response to an ATP command speed signal received from the rail, controlling the speed of the electric motor vehicle, and stopping the electric motor vehicle at a predetermined stop position. Namely, when one of the microcomputers 10 and 11, the logic circuits 15 and 16, and the matcher 20 constituting the ATP device breaks down and a predetermined brake command is not outputted, a serious accident may be caused, so that it is necessary to stop the electric motor vehicle surely when a failure of one of the aforementioned circuits and devices is detected.

This failure detection function now will be explained with reference to FIG. 1. The control data 12 inputted to the logical circuit 15 of the system A is checked by the failure detector 153 and the output signal 154 thereof is inputted to the failure detector of the system B. The control data 13 inputted to the logical circuit 16 of the system B is checked by the failure detector 163 and the output signal 164 thereof is inverted in sign by the inverter 19 and inputted to the failure detector 153 of the system A as the sign inversion failure detection signal 165. In this case, it is assumed that the signal voltage level at which the circuit does not operate to indicate a failure is L and the signal voltage level at which the circuit operates to indicate a failure is H.

When the control data 12 and 13 which are inputted to the logic circuits 15 and 16 of the systems A and B are normal, the output signals 154 and 164 of the failure detectors 153 and 163 become L. The output signal 164 of the failure detector 163 of the system B is inverted in sign by the inverter 19, so that the sign inversion failure detection signal 165 becomes H.

As to CRC data inputted to the failure detector 153 of the logical circuit 15, one of the two CRC data $D_{CRC10}$ and $D_{CRC11}$ is selected by the H-level sign inversion failure detection signal 165 of the logic circuit 16 and is inputted to the failure detector 153 or the CRC data which is inputted first is changed to the other CRC data. For example, $D_{CRC10}$ is controlled to be changed to $D_{CRC11}$.

It is desirable for the data possessed by each CRC data to be the same in each of the systems A and B. In this embodiment, it is a precondition that all the data are the same. Namely, the data $DI_0$ to $DI_{n-1}$ of each of the CRC data $D_{CRC10}$, $D_{CRC11}$, $D_{CRC20}$, and $D_{CRC21}$, are the same. On the other hand, CRC data inputted to the failure detector 163 of the logic circuit 16 is not changed to the other CRC data because the failure detection signal 154 is in the L state.

The processing is started from this state. In this case, it is assumed that the CRC data of the control data 12 and 13 which are selected in each failure detector first is $D_{CRC10}$ in the system A and $D_{CRC20}$ in the system B.

Figure 5:
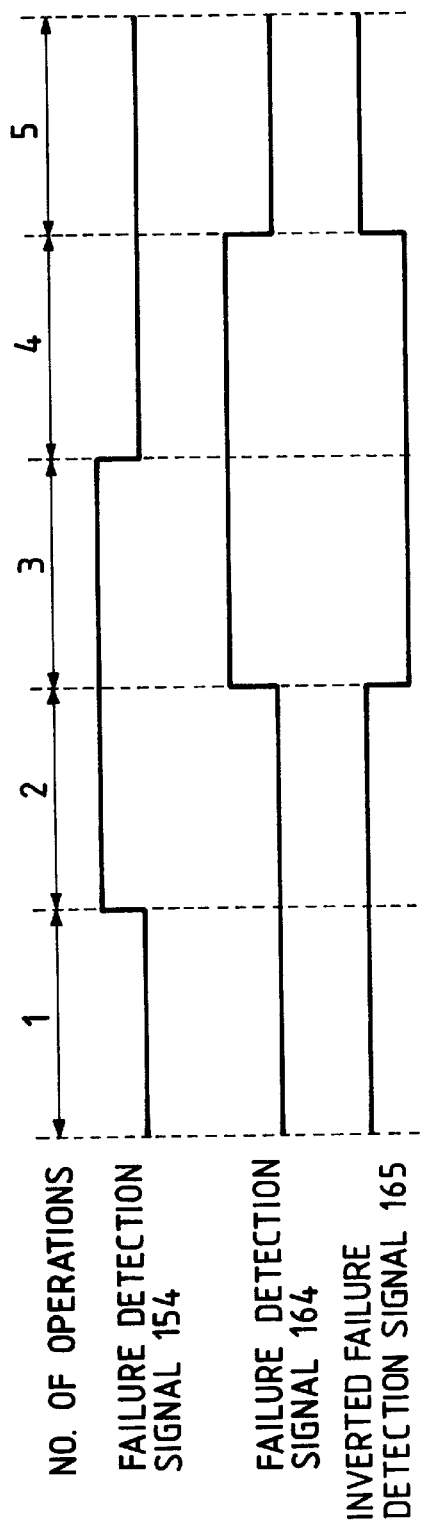
FIG. 5 is a signal diagram which shows the number of operations and failure signal waveforms.

FIG. 5 shows the relation of the operation waves between the number of operations, the output signal 154 of the failure detector 153, and the output signal 164 of the failure detector 163.

In the first operation, the control data 12 from the microcomputer 10 is supplied to the logic circuit 15 of the system A and the ATP command speed signal is converted to the predetermined command speed frequency $f_{ATPn}$, by the logic circuit 15 and outputted as the output signal 17. For the CRC data of this control data 12, $D_{CRC11}$ which is incorrect CRC data is selected for the failure detector 153 by the H-level sign inversion failure detection signal 165 of the system B. Therefore, a failure is detected in the failure detector 153 and the failure detection signal 154 becomes H.

On the other hand, the control data 13 from the microcomputer 11 is supplied to the logic circuit 16 of the system B and the ATP command speed signal is converted to the predetermined command speed frequency $f_{ATPn}$ by the logic circuit 16 and outputted as the output signal 18. The CRC data of this control data 13 is left unchanged as $D_{CRC20}$ because the failure detection signal 154 of the system A is in the previous state, that is, in the L state. Therefore, the failure detection signal 164 of the failure detector 163 is left unchanged at L and the sign inversion failure detection signal 165 enters the H state. Namely, at the end of the first operation, the failure detection signal 154 of the system A becomes H and the failure detection signal 164 remains L.

In the second operation, the ATP command speed signal is converted to the predetermined command speed frequency $f_{ATPn}$ and the output signals 17 and 18 are left unchanged. However, for the CRC data of the control data 12 to be inputted to the logic circuit 15 of the system A, $D_{CRC11}$ is selected by the H-level sign inversion failure detection signal 165 of the system B and the failure detection signal 154 of the logic circuit 15 is held in the H state as mentioned above.

On the other hand, for the CRC data of the control data 13 to be inputted to the logic circuit 16 of the system B, $D_{CRC21}$ is selected by the failure detection signal 154 which is in the H state which is the final state of the first operation of the system A. Therefore, a failure is detected in the failure detector 163, and the failure detection signal 164 is changed from L to H, and the sign inversion failure detection signal 165 is changed from H to L. Namely, at the end of the second operation, the failure detection signal 154 of the system A remains H and the failure detection signal 164 also becomes H.

In the third operation, the ATP command speed signal is converted to the predetermined command speed frequency fAIpn and the output signals 17 and 18 are left unchanged. However, the CRC data of the system A is changed from $D_{CRC11}$ to $D_{CRC10}$ because the sign inversion failure detection signal 165 of the system B is L. Therefore, the failure detection signal 154 of the logic circuit 15 is changed from H to L.

On the other hand, for the CRC data of the control data 13 to be inputted to the logic circuit 16 of the system s, $D_{CRC21}$ is selected by the failure detection signal 154, which is in the H state, the final state of the second operation of the system A. Therefore, a failure is detected in the failure detector 163, and the failure detection signal 164 is left unchanged in the H state, and the sign inversion failure detection signal 165 is also left unchanged in the L state. Namely, at the end of the third operation, the failure detection signal 154 of the system A becomes L and the failure detection signal 164 remains H.

In the fourth operation, the ATP command speed signal is converted to the predetermined command speed frequency $f_{ATPn}$ and the output signals 17 and 18 are left unchanged. However, since the sign inversion failure detection signal 165 of the system B to be inputted to the logic circuit 15 of the system A is L, the CRC data is left unchanged as $D_{CRC10}$.

Therefore, the failure detection signal 154 of the logic circuit 15 is left unchanged at L.

On the other hand, for the CRC data of the control data 13 to be inputted to the logic circuit 16 of the system B, $D_{CRC20}$ is selected because the failure detection signal 154 of the system A is in the L state, which is the final state of the third operation. Namely, the failure detection signal 164 is changed from H to L and the sign inversion failure detection signal 165 is changed from L to H. Namely, at the end of the fourth operation, the failure detection signal 154 of the system A becomes L and the failure detection signal 164 remains L.

In the fifth operation, the ATP command speed signal is conVerted to the predetermined command speed frequency $f_{ATPn}$ and the output signals 17 and 18 are left unchanged. However, since the sign inversion failure detection signal 165 of the system B to be inputted to the logic circuit 15 of the system A is H, for the CRC data, $D_{CRC11}$ is selected. Therefore, the failure detection signal 154 of the logic circuit 15 is changed from L to H.

On the other hand, for the CRC data of the control data 13 to be inputted to the logic circuit 16 of the system B, $D_{CRC20}$ is selected because the failure detection signal 154 of the system A is in the L state, which is the final state of the fourth operation. As a result, the failure detection signal 164 of the failure detector 163 is held in the L state and the sign inversion failure detection signal 165 is also held in the H state.

The processing is returned to the first operation status and then the above operations are repeated.

In the aforementioned example, control is effected so that, when the failure detection signal 154 and the sign inversion failure detection signal 165 are in the L state, $D_{CRC10}$ is selected in the system A and $D_{CRC20}$ is selected in the system B, and when they are in the H state, $D_{CRC11}$, is selected in the system A and $D_{CRC21}$ is selected in the system B. The relation between the failure detection signal and control of selection of the CRC data may be changed variously depending on the application.

Although it is assumed that $D_{CRC10}$ in the system A and $D_{CRC20}$ in the system B are correct data of the CRC data, and $D_{CRC11}$ in the system A and $D_{CRC21}$ in the system B are incorrect data of the CRC data, the reverse also may be assumed. In this case, correct and incorrect data are provided by generation polynomial expressions of the CRC checker which are different.

As mentioned above, the CRC data $D_{CRC2}$ of the system B is controlled by the failure detection signal 154 of the logic circuit 15 of the system A and the CRC data $D_{CRC1}$ of the system A is controlled by the sign inversion failure detection signal 165 of the failure detection signal 164 of the logic circuit 16 of the system B. Therefore, when all of the circuits, such as the microcomputers 10 and 11 and the logic circuits 15 and 16 and the control data are normal, the failure detection signals 154 and 164 alternate with a fixed period.

By the way, the logic circuit 15, the failure detection signal 154, the logic circuit 16, and the failure detection signal 164 constitute a failure detection loop, so that a failure in this loop can be detected by a method for monitoring one of the failure detection signals 154 and 164. However, a failure in a portion off this failure detection loop cannot be detected. To prevent an incorrect signal from being outputted or a correct signal from not being outputted due to a failure in a portion off this failure detection loop, the failure detection signal 154 of the system A and the failure detection signal 164 of the system B are correlated by the matcher 20.

FIG. 4 is a drawing showing an example in which an electric motor vehicle stops at a predetermined position in response to a brake command $B_5$ and shows a brake command 21 and braking force when the brake is released for starting, for example, when the logic circuit 15 of the system A breaks down.

When the alternation of the failure detection signal 154 of the system A and the failure detection signal 164 of the system B is stopped, the alternation of a failure detection correlation output signal 24 is stopped. As a result, an emergency brake signal EB is outputted from the braking device 21 so as to apply the maximum braking force to the electric motor vehicle. This emergency brake signal EB operates, as shown in FIG. 4, prior to the other brake commands $B_1$ to $B_5$. By monitoring the alternation of one of the failure detection signals 154 and 164, it is possible to verify which one of the duplicated systems A and B breaks down, and the failure can be analyzed easily, and a fail safe system can be constructed effectively.

Figure 6:
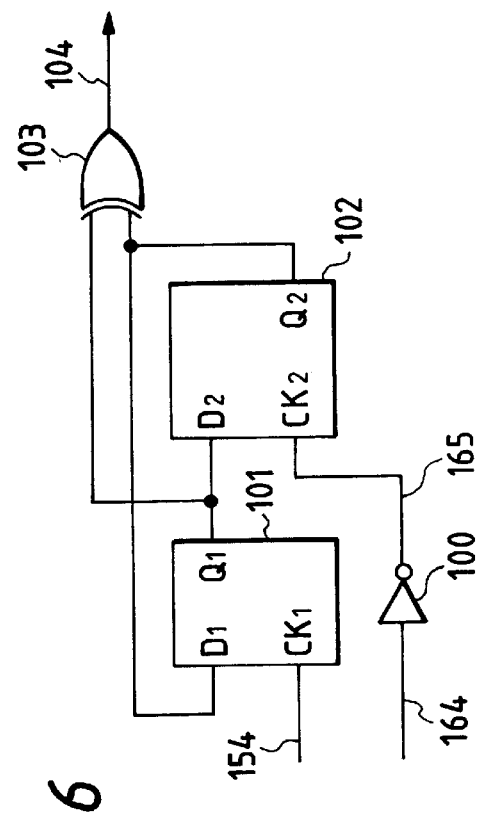
FIG. 6 is a schematic circuit diagram of a frequency matcher.
Figure 7:
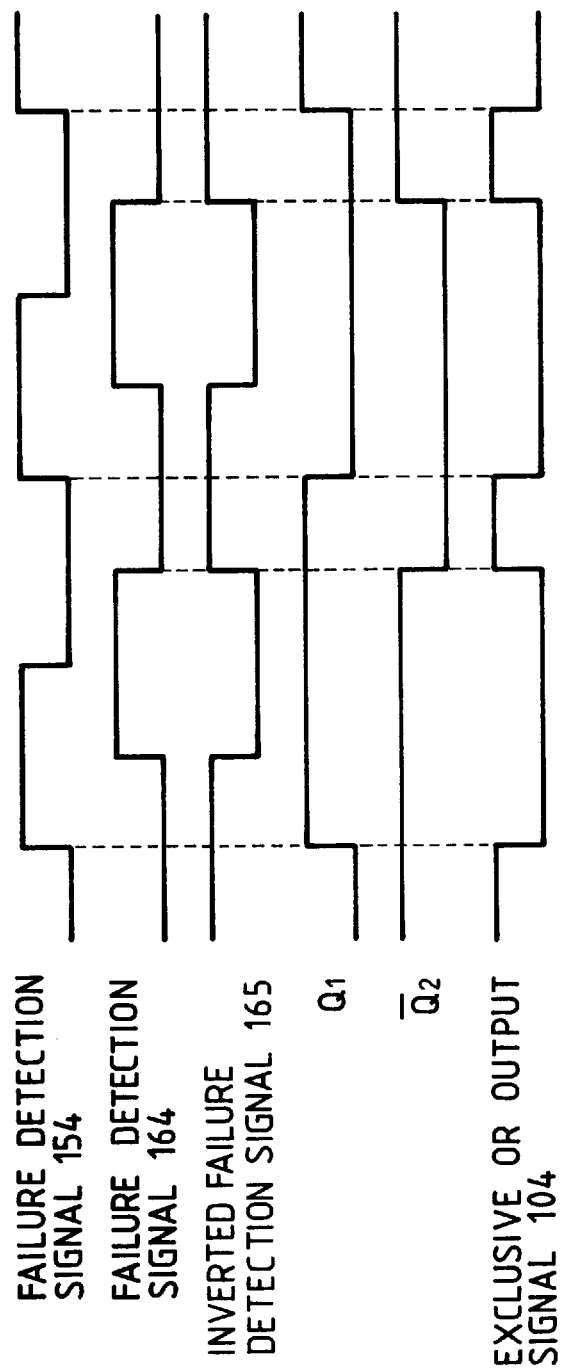
FIG. 7 is a timing chart of the frequency matcher.

FIG. 6 shows a 1-bit fail safe matcher and FIG. 7 shows the operation waveforms thereof. In FIG. 6, numeral 100 indicates a sign inverter, 101 denotes a first flip-flop, 102 denotes a second flip-flop, 103 denotes an exclusive OR gate, 104 denotes a collation output signal, 154 denotes the failure detection signal of the logic circuit 15 shown in FIG. 1, and 164 denotes the failure detection signal of the logic circuit 16 shown in FIG. 1.

Since the failure detection signals 154 and 164 alternate with a fixed period, the failure detection signal 154 is inputted to a clock terminal $CK_1$ of the first flip-flop 101. When the failure detection signal 164 is inverted in sign by the inverter 100 and inputted to a clock terminal $CK_2$ of the second flip-flop 102, an output $Q_1$ of the first flip-flop 101 and a negative (inverted) output $Q_2$ of the second flip-flop 102 are formed as shown in FIG. 6. When the output $Q_1$ of the first flip-flop 101 and the negative output $Q_2$ of the second flip-flop 102 are inputted to the exclusive OR gate 103, as shown in FIG. 6, the exclusive OR output signal 104 can be obtained. When the alternation of one of the failure detection signals 154 and 164 is stopped or one of the flip-flops breaks down and the output terminal thereof is fixed to H or L, the alternation of the output signal 104 of the exclusive OR gate 103 is stopped.

Since the matcher correlates two signals surely, the outputs thereof always alternate in the normal state. Therefore, by monitoring the output signal 104, not only the loop of the systems A and B, but also the whole ATP device, can be monitored to determine whether they are normal or abnormal. On the other hand, it may be desirable to monitor only this output signal 104.

FIG. 6 shows a fail safe matcher for correlating a 1-bit output. To correlate a plurality of bits in a fail safe manner, it is desirable to provide only the circuit shown in FIG. 6. The matcher 20 shown in FIG. 1 is equivalent to that of the circuit shown in FIG. 6 having a plurality of bits built-in.

Therefore, it is desirable that a controller or a system for receiving an output signal from the ATP device has a capability for outputting an emergency control signal, because the outputting of alternating signals of the matcher 20 is stopped, and it is made possible to construct a system for realizing fail safe operation surely by this constitution.

The aforementioned is an explanation of an embodiment in which the brake command 21 of the matcher 20 is outputted serially. However, it is possible for $B_1, B_2, B_3, B_4$, and $B_5$ of the brake command 21 to be outputted to the braking device 22 in parallel. In other words, it is desirable that the matcher 20 is structured so that the command becomes a signal of the type necessary for the braking device 22.

As mentioned above, when a memory retaining control data is not built in the microcomputer, but is in the ATP device, or it is installed independently, a dedicated memory reading signal line, a writing signal control circuit, and an address signal generation circuit are necessary in the logic element which is the controller 14. However, it is possible for the microcomputer and the controller only transmit and receive information via the memory, in which are the microcomputer can be used for other control processing, so that the efficiency of the microcomputer can be increased.

In this embodiment, an example has been described in which there are two CRC data provided for one logic circuit and the CRC data are switched by a failure detection signal from another logic circuit. However, as mentioned in FIG. 18, it is possible to easily provide an arrangement in which the content of the data is not checked, and just alternating signals are generated, and whether the two logic circuits operate normally or abnormally is outputted.

Figure 8:
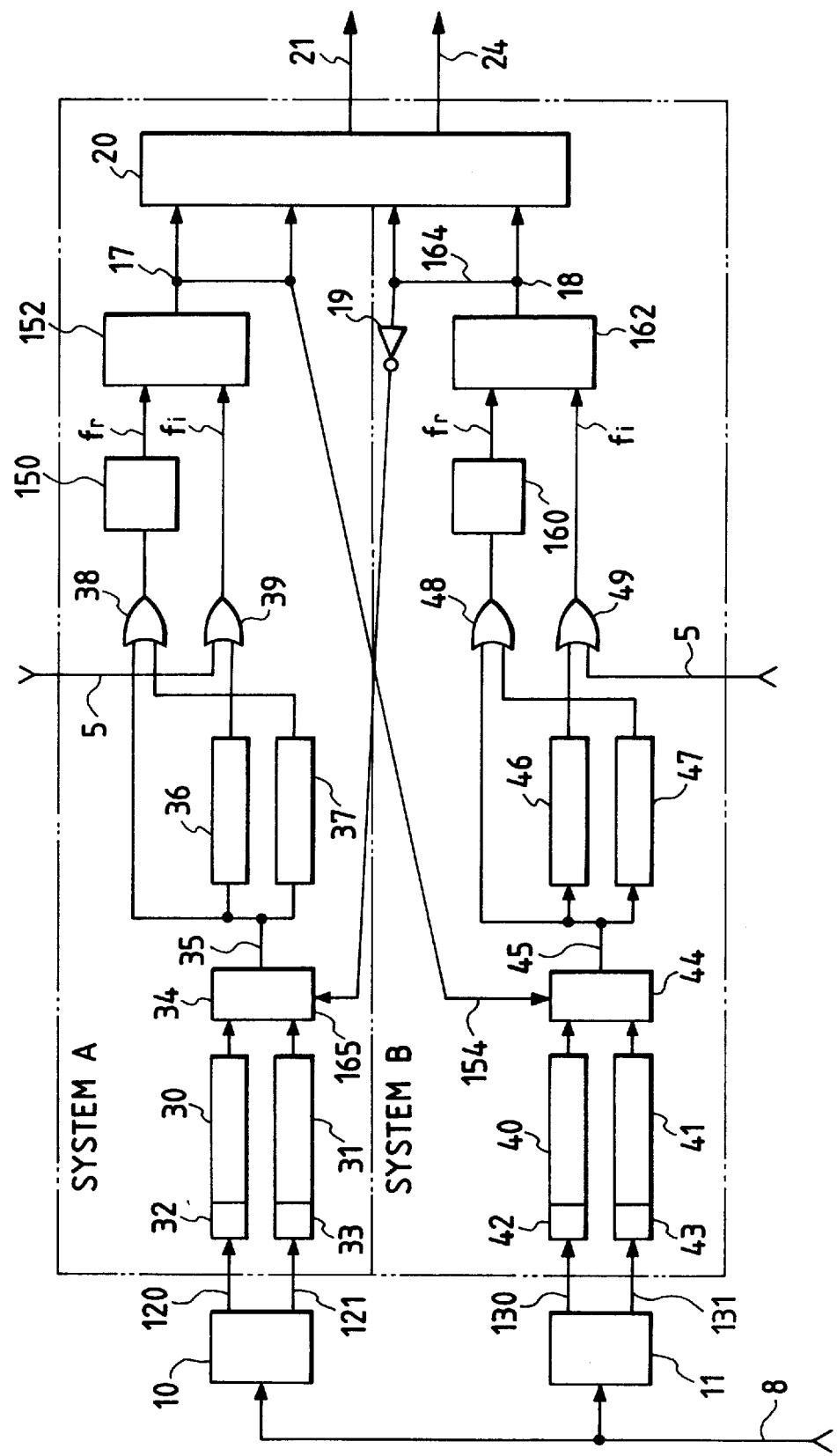
FIG. 8 is a schematic diagram another embodiment of the present invention.

Next, another embodiment will be explained with reference to FIG. 8. In FIG. 8, as in FIG. 1, the same circuit is mounted on one chip representing the duplicated systems A and B. As mentioned above, the ATP device is a maintenance device necessary for safe running of an electric motor vehicle and it is never permitted that an incorrect signal is outputted or that a predetermined signal is not outputted due to a failure in the ATP device. Therefore, the failure detection function in the embodiment shown in FIG. 8 is further strengthened.

In FIG. 8, the same code as that shown in FIG. 1 has the same function, so that the explanation thereof will be omitted. In FIG. 8, numeral 30 indicates a first memory mounted in the logic circuit 15 of the system A, 31 denotes a second memory, 32 denotes CRC data of control data 120 stored in the first memory 30, 33 denotes CRC data of control data 121 stored in the second memory 31, 34 denotes a switching circuit for the first memory 30 and the second memory 31, 35 denotes an output signal of the memory switching circuit 34, 36 denotes a first CRC check circuit for the control data 120 stored in the first memory 30, 37 denotes a second CRC check circuit for the control data 121 stored in the second memory 31, 38 denotes a first OR circuit for adding the output signal 35 of the switching circuit 34 and an output signal of the second CRC check circuit 37, and 39 denotes a second OR circuit for adding an output signal of the first CRC check circuit 36 and the speed frequency signal 5 corresponding to the running speed of an electric motor vehicle.

Numeral 40 indicates a first memory mounted in the logic circuit 16 of the system B, 41 denotes a second memory, 42 denotes CRC data of control data 130 stored in the first memory 40, 43 denotes CRC data of control data 131 stored in the second memory 41, 44 denotes a switching circuit for the first memory 40 and the second memory 41, 45 denotes an output signal of the memory switching circuit 44, 46 denotes a first CRC check circuit for the control data 130 stored in the first memory 40, 47 denotes a second CRC check circuit for the control data 131 stored in the second memory 41, 48 denotes a first OR circuit for adding the output signal 45 of the switching circuit 44 and an output signal of the second CRC check circuit 47, and 49 denotes a second OR circuit for adding an output signal of the first CRC check circuit 46 and the speed frequency signal 5 corresponding to the running speed of an electric motor vehicle.

The ATP command speed signal 8 is processed by the microcomputers 10 and 11 and the respective control data is inputted to the logic circuits of the systems A and B of the 1-chip logic element 14.

Namely, the first control data 120 from the microcomputer 10 is stored in the first memory 30 of the system A, and the second control data 121 is stored in the second memory 31 of the system A, and the first control data 130 from the microcomputer 11 is stored in the first memory 40 of the system B, and the second control data 131 is stored in the second memory 41 of the system B.

Figure 9:
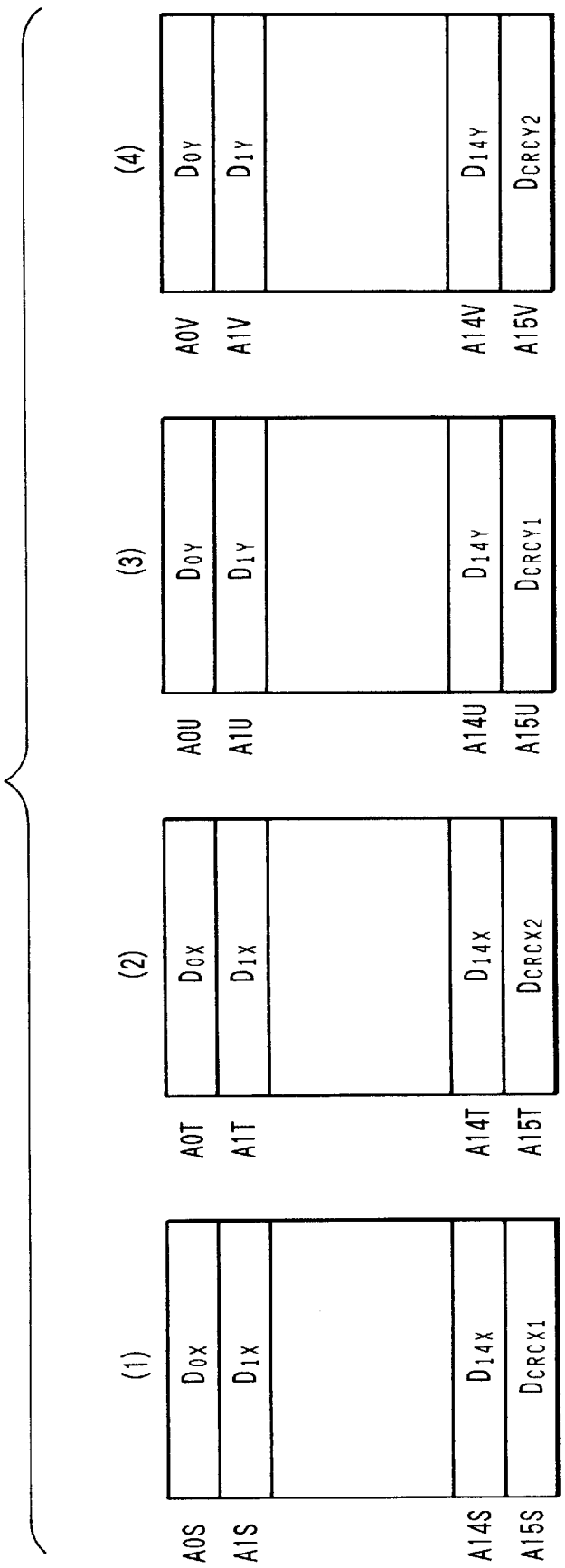
FIG. 9 is a data configuration diagram of each memory.

FIG. 9 shows data which is stored in the memories 30, 31, 40, and 41 from the microcomputers 10 and 11.

The microcomputer 10 converts the ATP command speed signal 5 to n-word data $D_{0X}$ to $D_{14X}$, processes and obtains the CRC data 32 (data is $D_{CRCX1}$) of the data $D_{0X}$ to $D_{14X}$ when the generation polynomial expression is set to G0(X) at the same time, and stores the data in configuration (1) shown in FIG. 9 in which the CRC data 32 (data is $D_{CRCX1}$) is added to the data $D_{0X}$ to $D_{14X}$ at the addresses A0S to A15S of the first memory 30.

The microcomputer 10 processes and obtains the CRC data 33 (data is $D_{CRCX2}$) of the data $D_{0X}$ to $D_{14X}$ when the generation polynomial expression is set to G1(X) and stores the data in configuration (2) shown in FIG. 9 in which the CRC data 33 (data is $D_{CRCX2}$) is added to the data $D_{0X}$ to $D_{14X}$ at the addresses A0T to A15T of the second memory 31.

The microcomputer 11 converts the ATP command speed signal 5 to n-word data $D_{0Y}$ to $D_{14}Y$, processes and obtains the CRC data 42 (data is $D_{CRCY1}$) of the data $D_{0Y}$ to $D_{14Y}$ when the generation polynomial expression is set to G2(X) at the same time, and stores the data in configuration (3) shown in FIG. 9 in which the CRC data 42 (data is $D_{CRCY1}$) is added to the data $D_{0Y}$ to $D_{14Y}$ at the addresses A0U to A15U of the first memory 40.

The microcomputer 11 processes and obtains the CRC data 43 (data is $D_{CRCY2}$) of the data $D_{0Y}$ to $D_{14Y}$ when the generation polynomial expression is set to G3(X) and stores the data in configuration (4) shown in FIG. 9 in which the CRC data 43 (data is $D_{CRCY2}$) is added to the data $D_{0Y}$ to $D_{14Y}$ at the addresses A0V to A15V of the second memory 41.

The data which is stored at the addresses A0S to A15S of the first memory 30 of the system A and the addresses A0T to A15T of the second memory 31 are converted from parallel to serial, read sequentially from the low-order bits to the high-order bits, and inputted to the switching circuit 34. In the same way, the data which is stored at the addresses A0U to A15U of the first memory 40 of the system R and the addresses A0V to A15V of the second memory 41 are converted from parallel to serial, read sequentially from the low-order bits to the high-order bits, and inputted to the switching circuit 17. The period from reading the addresses A0n to A15n to processing by the frequency comparators 152 and 162 is one processing period.

The first CRC check circuit 36 of the system A is a circuit corresponding to the generation polynomial expression G0(X) and the second CRC check circuit 37 is a circuit corresponding to the generation polynomial expression G1(X).

The third CRC check circuit 46 of the system B is a circuit corresponding to the generation polynomial expression G2(X) and the fourth CRC check circuit 47 is a circuit corresponding to the generation polynomial expression G3(X).

It is assumed that the failure detection signal 154 of the system A and the failure detection signal 164 of the system B are in the L state first. Therefore, the sign inversion failure detection signal 165 of the system B is H. By this H-state sign inversion signal 165 of the system B, the switching circuit 34 of the system A is switched to effect reading of the data of the first memory 30, and the switching circuit 44 of the system B is switched to effect reading of the data of the second memory 41 by the L-state sign inversion signal a 54 of the system A, and all the data and the internal circuit are assumed to be normal.

The data $D_{0X}$ to $D_{14X}$ at the addresses A0S to A14S of the first memory 30 of the system A and the data $D_{0X}$ to $D_{14X}$ at the addresses A0T to A14T of the second memory 31 are inputted to the frequency converter 150 via the switching circuit 34 and the first logic circuit 38 and converted to the ATP command speed frequency $f_{rn}$ corresponding to the respective data, whereas the data $D_{0X}$ to $D_{14X}$ at the addresses A0S to A14S and A0T to A14T are inputted to the first CRC check circuit 36 and the second CRC check circuit 37 and checked by the CRC data $D_{CRCX1}$ and $D_{CRCX2}$ at the addresses A15S and A15T. Therefore, it is structured so that, until the CRC data $D_{CRCX1}$ and $D_{CRCX2}$ at the addresses A15S and A15T are all read and checked, the intermediate check result for the first check circuit 36 and the second check circuit 37 is not outputted. The CRC data $D_{CRCX1}$ and $D_{CRCX2}$ at the addresses A15S and A15T are structured so as not to be frequency-converted.

In the same way, the data $D_{0Y}$ to $D_{14Y}$ at the addresses A0U to A14U of the first memory 40 of the system B and the data $D_{0Y}$ to $D_{4Y}$ at the addresses A0V to A14V of the second memory 41 are inputted to the frequency converter 160 via the switching circuit 44 and the first logic circuit 48 and converted to the ATP command speed frequency $f_{rn}$ corresponding to the respective data, whereas the data $D_{0Y}$ to $D_{14Y}$ at the addresses A0U to A14U and A0V to A14V are inputted to the first CRC check circuit 46 and the second CRC check circuit 47 and checked by the CRC data $D_{CRCY1}$ and $D_{CRCY2}$ at the addresses A15U and A15V. Therefore, it is structured so that, until the CRC data $D_{CRCY1}$ and $D_{CRCY2}$ at the addresses A15U and A15V are all read and checked, the intermediate check result for the first check circuit 46 and the second check circuit 47 is not outputted. The CRC data $D_{CRCY1}$ and $D_{CRCY2}$ at the addresses A15U and A15V are structured so as not to be frequency-converted.

Firstly, the one-word data at the address A0S of the first memory 30 of the system A is inputted to the frequency converter 150 via the OR circuit and converted to the ATP command speed frequency fr0 corresponding to the one-word data. On the other hand, since the first CRC check circuit 36 and the second CRC check circuit 37 are checking data, the outputs thereof are L.

Next, the one-word data at the address A1S is inputted to the frequency converter 150 via the OR circuit 38 and converted to the ATP command speed frequency $f_{r1}$ corresponding to the one-word data at the address A1S. On the other hand, the input frequency $f_{i1}$ which is an output of the OR circuit 39 is L.

Hereafter, in the same way, each one-word data is converted to the ATP command speed frequency $f_{r14}$ corresponding to the data up to the address A14S.

The one-word CRC data $D_{CRCX1}$ (data by the generation polynomial expression G0(X)) at the last address A15S is decided as normal by the first CRC check circuit 36 (circuit corresponding to the generation polynomial expression G0(X)), so that the output thereof is L. However, since the one-word CRC data $D_{CRCX1}$ is determined to be abnormal by the second CRC check circuit 37 (circuit corresponding to the generation polynomial expression G1(X)), the output thereof is H.

The output of this second CRC check circuit is inputted to the frequency converter 150 as maximum data via the OR circuit 38 and converted to the maximum frequency $fr_{r15}$. On the other hand, the input frequency $f_{i15}$ which is an output of the OR circuit 39 is L. The frequency $f_{rn}$ corresponding to the data at each address which is obtained in this way and the input frequency $f_{in}$ are compared by the frequency comparator 152.

In the frequency comparator 152, when the relation between the ATP command speed frequency frn and the addition frequency $f_{in}$ is $f_{rn} > f_{in}$, 1 is added to the internal counter value (not shown in the drawing), and when the relation is $f_{rn} < f_{in}$, 1 is subtracted from the counter value, and when $f_{rn} = f_{in}$, nothing is added to or subtracted from the counter value.

In the first processing period, 1 is added to the counter value in correspondence to the addresses A0S to A14S. In the second processing period, the data is read from the address A0S again and the counter value of the frequency comparator 152 is incremented by the same operation as that mentioned above. When the fourth processing period elapses and the counter value of the frequency comparator 152 reaches 4, the output signal 17 corresponding to each of the addresses from A0S to A15S is obtained.

Figure 10:
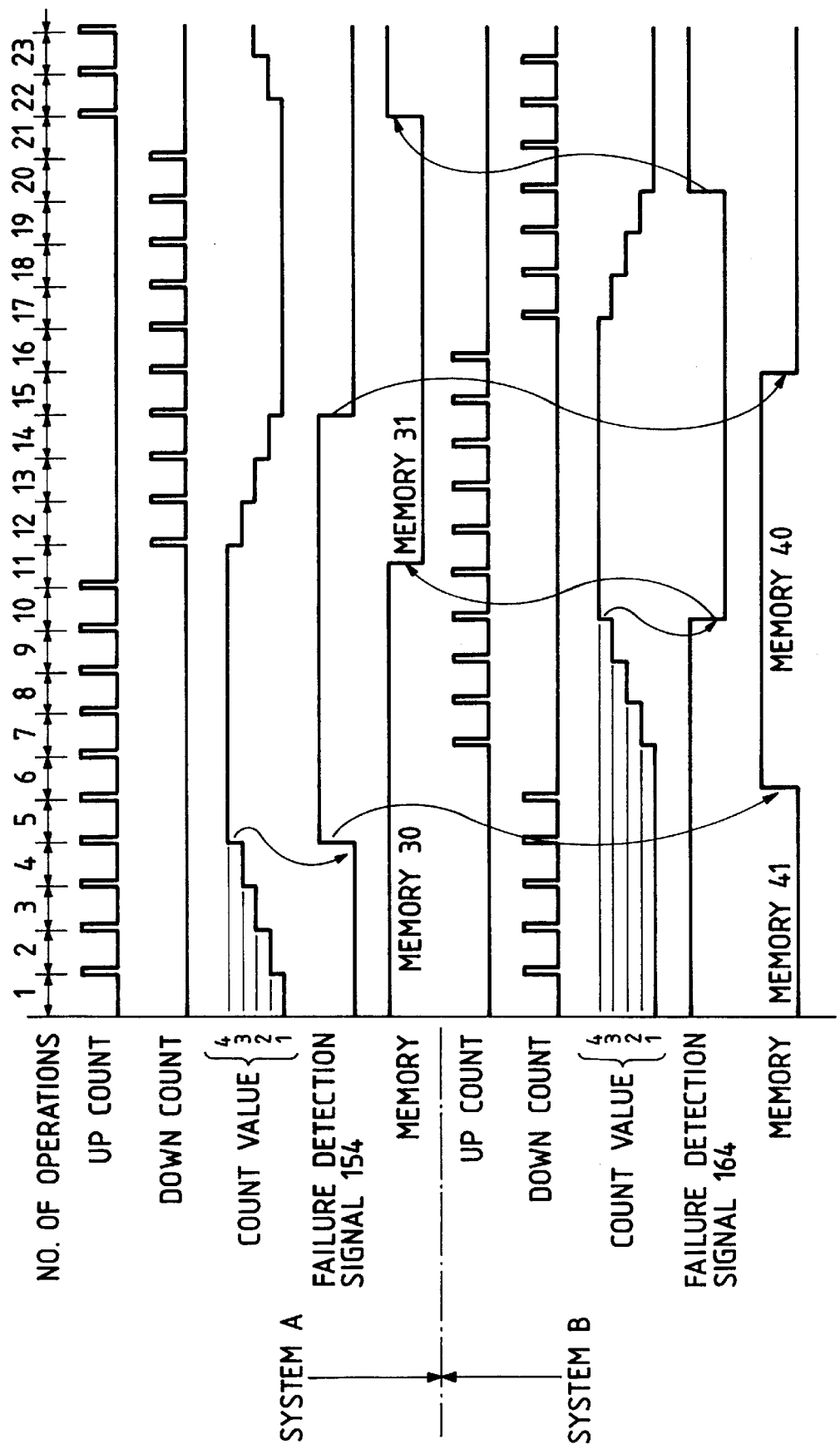
FIG. 10 is a timing diagram for explaining failure detection signals and a memory switching operation.

FIG. 10 shows the relation between the operation of the counter of the frequency comparator 152 due to the CRC check result at the address A15S of the system A, the operation of the counter of the frequency comparator 162 due to the CRC check result at the address A15U of the system B, and the sign inversion signal 165 which inverts the sign of the failure detection signal 164.

When the counter value reaches 4 by an up-count pulse, the output signal 17 of the frequency comparator 152 is obtained. Since this output signal 17 is outputted serially, the frequency comparator 152 detects the H-state failure detection signal 154 corresponding to the address A15S in synchronization with a timing signal (not shown in the drawing) and inputs it to the memory switching circuit 44 of the system B.

The switching circuit 44 switches the memory 41 to the memory 40 in exact timing with the beginning of the next processing period, so that the memory of the system B is actually switched at the beginning of the sixth processing period. The data stored at the addresses A0U to A14U of the memory 40 is exactly the same as the data stored at the addresses A0V to A14V of the memory 41, so that even if the memory 41 is switched to the memory 40, the ATP command speed frequency $f_{rn}$ will not be changed and the input frequency $f_{in}$ will not be changed. Therefore, the output frequency of the frequency converter 160 will not be changed. Only the CRC data 42 ($D_{CRCY1}$) stored at the address A15U and the CRC data 43 ($D_{CRCY2}$) stored at the address A15V are different, so that the operation when the data at the addresses A15U and A15V are read will be explained.

When the memory 41 is switched to the memory 40, the CRC data 42 (data by the generation polynomial expression) is read. Since the CRC data 42 is determined to be normal by the first CRC check circuit 46 (circuit corresponding to the generation polynomial expression G2(X)), the output thereof is L. However, since it is determined to be abnormal by the second CRC check circuit 47 (circuit corresponding to the generation polynomial expression G3(X)), the output thereof is H. Since the output of the first CRC check circuit 46 is L, the output of the OR circuit 49 is also L and the input frequency $f_{i15}$ is also L.

On the other hand, the H-state output of the second CRC check circuit 47 is inputted to the frequency converter 160 via the OR circuit 48 and converted to the maximum frequency $f_{r15}$. This maximum frequency $f_{r15}$ and the input frequency $f_{i15}$ are inputted and compared by the frequency comparator 162. Since the relation between the maximum frequency $f_{r15}$ and the input frequency $f_{i15}$ is $f_{i15} > f_{i15}$, the counter value of the frequency comparator 162 is incremented to 1.

By the same operation as that of the system A, the counter value of the frequency comparator 162 is incremented and when the counter value reaches 4, the output signal 18 corresponding to each of the addresses from A0U to A15U is obtained. The frequency comparator 162 detects the H-state failure detection signal 164 corresponding to the address A15U of this output signal 18 in synchronization with the timing signal (not shown in the drawing) and adds the L-state sign inversion signal 165, which is inverted in sign by the inverter 19, to the memory switching circuit 34 of the system A.

When the sign inversion signal 165 is inputted, the memory switching circuit 34 of the system A switches the memory 30 to the memory 31 from the next 11th period.

Only the CRC data 32 ($D_{CRCX1}$) stored at the address A15S and the CRC data 33 ($D_{CRCX2}$) stored at the address A15T are different between the memory 30 and the memory 31, so that the frequency will not be changed when the memory is switched as mentioned above.

Since the CRC data 33 of the memory 31 is data by the generation polynomial expression G1(X), it is determined to be abnormal by the CRC check circuit 36 and the output signal thereof becomes H. This output signal is inputted to the frequency converter 152 as a maximum frequency $f_{i15}$ via the second OR circuit 39. On the other hand, since the CRC data 33 of the memory 31 is data by the generation polynomial expression G1(X), it is determined to be normal by the CRC check circuit 37, and the output signal thereof becomes L, and the output signal of the OR circuit 38 also becomes L, and the reference frequency $f_{r15}$ of the frequency converter 150 also becomes L. Therefore, the relation between the reference frequency $f_{r15}$ and the input frequency $f_{i15}$ becomes $f_{r15} < f_{i15}$ and a count-down pulse is given, so that 1 is subtracted from the counter value of the frequency comparator 152 and the counter value is changed from 4 to 3.

When the counter value of the frequency comparator 152 becomes 0, the output signal 17 of the frequency comparator 152 also becomes L and the failure detection signal 154 corresponding to the address A15T becomes L. By the same operation, the memory of the opposite system is switched alternately by a failure detection signal of the frequency comparator of its own system.

When the memories 30 and 31 of the system A, the data read from them, the two CRC check circuits 36 and 37, the memories 40 and 41 of the system B, the data read from them, and the two CRC check circuits 46 and 47 are normal, as mentioned above, the failure detection signals 154 and 164 change alternately to H or L respectively whenever the memory is changed. For example, when an error occurs in the data of the memory 30 of the system A, the following is caused. The data error of the memory 30 is detected by the CRC check circuit 36 and the output signal thereof becomes H.

On the other hand, CRC data by a different generation polynomial expression is inputted to the CRC check circuit 37 from the beginning, so that the output signal thereof also becomes H. Namely, since the output signals of both the check circuits become H, neither the counter value of the frequency comparator 152 nor the output will be changed. Therefore, the failure detection signal 154 for switching the memory 41 of the system B to the memory 41 is fixed to H or L, which is the state when a failure occurs and the memory cannot be switched from 41 to 40. As a result, the counter value of the frequency comparator 162 will not be incremented and the failure detection signal is fixed to the L state. Therefore, the sign inversion failure detection signal 165 is fixed to H, and the memory 30 of the system A is not switched to the memory 31, and the output signals of the CRC check circuits 36 and 37 are fixed to H.

The above is an example of what happens when an error occurs in data. However, when one of the circuits breaks down, the counter values of the frequency comparators 152 and 162 are fixed as a result and the alternation of the failure detection signals 154 and 164 is stopped, so that it is desirable to monitor the alternation of the failure detection signals 154 and 164. When such a method for generating a signal is applied to the ATP device of a train, it can be used as a means for commanding operation of an emergency brake when the alternation of the failure detection signals 154 and 164 is stopped.

When this circuit comprises an LSI and is integrated to one chip including the peripheral circuit, miniaturization and mass production can be realized while maintaining reliability as an ATP device.

Since the ATP device constitutes a failure detection loop together with the failure detection signal 154 and the failure detection signal 164, as mentioned above, a failure within the loop can be detected by monitoring one of the failure detection signals 154 and 164, though a failure in a position outside of this failure detection loop cannot be detected. To prevent an incorrect signal from being outputted or a correct signal from not being outputted due to a failure in a position outside of this failure detection loop, the failure detection signals 154 and 164 are correlated by the matcher 20, and when a match occurs, the matcher 20 outputs a signal, and when a mismatch occurs, the matcher 20 outputs an emergency control signal.

The matcher 20 compares the output signal 17 of the frequency comparator 152 of the system A and the output signal 18 of the frequency comparator 162 of the system B. As mentioned above, since the output signal 17 and the output signal 18 are outputted serially in the order of address signals, the matcher 20 compares the signal corresponding to each address respectively and outputs only a matched signal. When a mismatch occurs, the matcher 20 can output an emergency control signal or display it on the display unit. Therefore, by using this constitution, a fail safe system can be constructed.

As mentioned above, according to the present invention, two CRC data in which different generation polynomial expressions are applied to one data item are produced, and two systems of control data, to which the CRC data are added, are produced, and two kinds of check circuits corresponding to different generation polynomial expressions are provided. This is a method for inputting the two systems of control data to the two kinds of check circuits at the same time and switching the two systems of data using the result obtained by comparing the outputs of the two kinds of check circuits. Therefore, an error can be detected not only in the data but also in the check circuits, and furthermore outputs are correlated and only when a match occurs will they be outputted. There is an advantage in that a fail safe system can be structured more surely by using a chip in which each of the circuits comprises an LSI.

Figure 11:
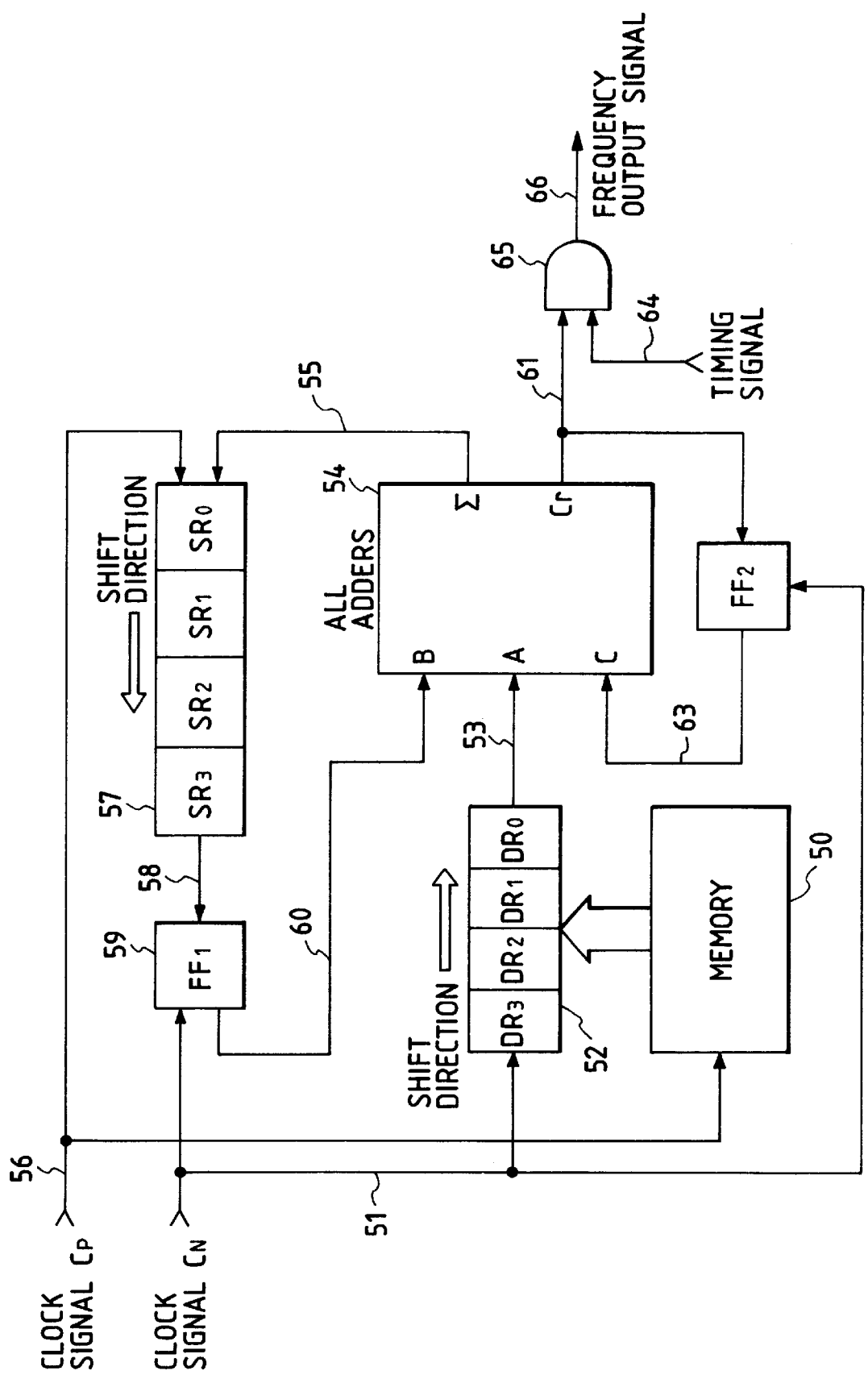
FIG. 11 is a block diagram of a frequency converter.
Figure 12:
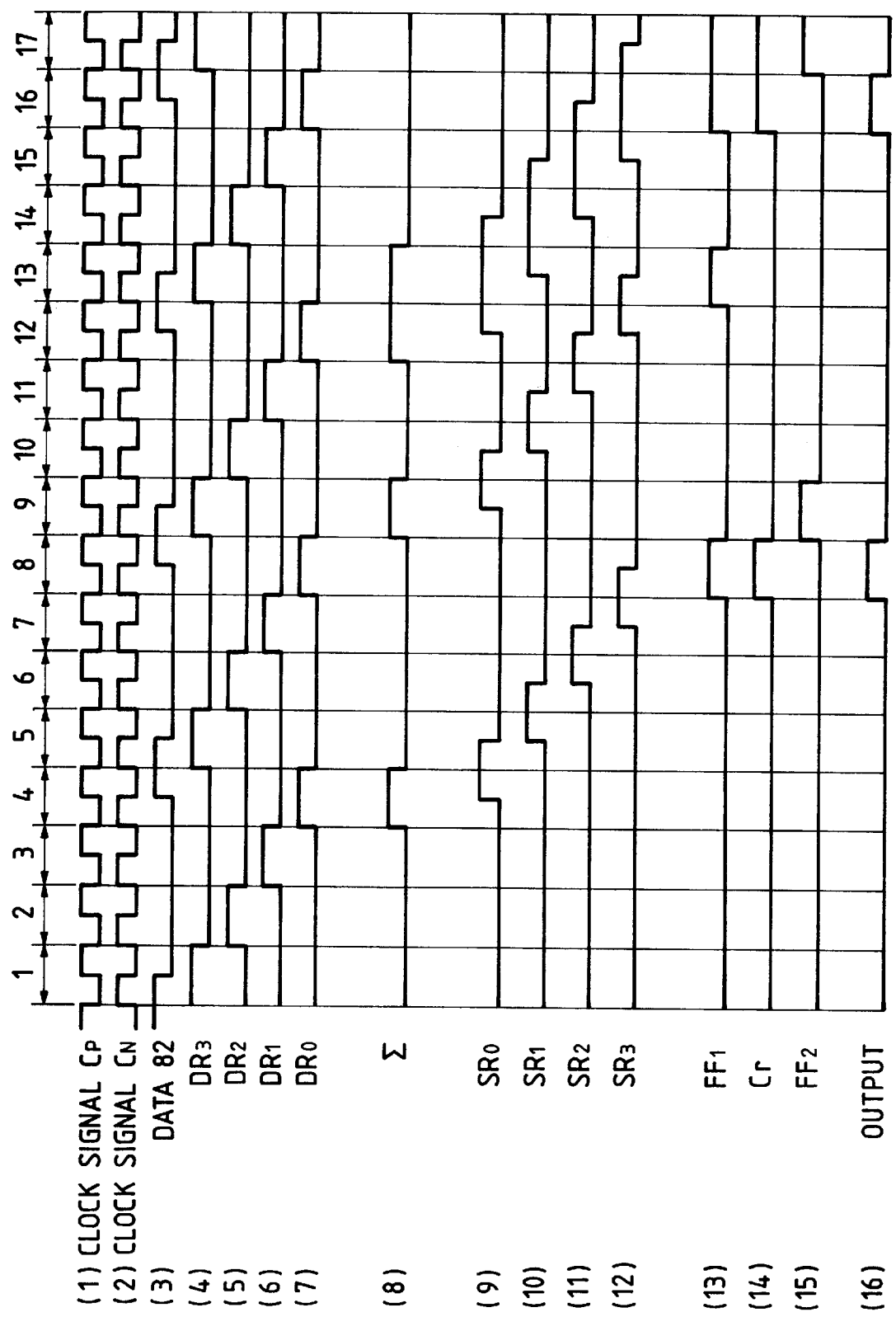
FIG. 12 is a timing diagram for a frequency conversion operation.

Next, the operation of the frequency converter 150 (160) shown in FIGS. 1 and 8 will be explained hereunder. FIG. 11 shows a frequency converter for converting digital data to a frequency and FIG. 12 is a flow chart of the operation of the frequency converter.

In FIG. 11, numeral 50 indicates a memory, 51 denotes a clock signal $C_N$, 52 denotes a data register, 53 denotes an output signal of the data register 52, 54 denotes all 1-bit adders, 55 denotes an addition output of all the adders 54, 56 denotes a clock signal $C_P$, 57 denotes a processing shift register, 58 denotes an output signal of the shift register 57, 59 denotes a first flip-flop for timing adjustment, 60 denotes an output signal of the flip-flop 59, 61 denotes a carrier output signal of all the adders 54, 62 denotes a second flip-flop for holding the carrier output signal 61, 63 denotes an output signal of the flip-flop 62, 64 denotes a timing signal, 65 denotes an AND circuit for removing the predetermined output signal from the carrier output signal 61, and 66 denotes an output signal of the frequency converter.

For simple explanation of the operation, it is assumed that the data length is 4 bits, and data of the same value is periodically read from the memory 50, and data of the data register 52 and the shift register 57 is shifted in the direction of the arrow. The clock signal $C_N 51$ and the clock signal $C_P 56$ are clock signals which are different in phase by 90° as shown at lines (1) and (2) in FIG. 12.

In the initial state, the initial values of the data register 52 and the shift register 57 are 02 (this means that the data value in binary is zero). It is assumed that the data value 82 (the data value in binary is 8) as shown in line (3) in FIG. 12 is read at the leading edge of the clock signal $C_P 56$ from the memory 50. Since this data is set in the data register 52 at the leading edge of the clock signal $C_N 51$, the most significant $DR_3$ bit to the least significant $DR_0$ bit are set as shown in line (4) in FIG. 12.

When the data in line (4) in FIG. 12 is shifted four times at the leading edge of the clock signal $C_N 51$, the value of the least significant $DR_0$ bit of the data register 52 is set as shown in line (7) in FIG. 12 and is added to the input terminal A of all the adders 54 as the output signal 53.

In this case, the output signal 60 of the first flip-flop 59 and the output signal 63 of the second flip-flop 62 are not added to the input terminals B and C of all the adders 54, so that the output signal 55 at the addition output terminal $\Sigma$ of all the adders 54 becomes H, as shown in line (8) in FIG. 12, and is added to the shift register 57. The output signal 61 at the carrier output terminal $C_r$ of all the adders 54 becomes L, as shown in line (14) in FIG. 12.

Since the output signal 55 of all the adders 54 is set in the shift register 57 at the leading edge of the clock signal $C_P 56$ shown in line (2) in FIG. 12, the least bit $SR_0$ of the shift register 57 is set as shown in line (9) in FIG. 12.

The data value 82 (8 in decimal) is read from the memory 50 at the leading edge of the same clock signal $C_P 56$ and is shifted on the data register 52 at the leading edge of the clock signal $C_N 51$. On the other hand, the data of the least significant bit $SR_0$ of the shift register 57 is shifted on the shift register 57 at the leading edge of the clock signal $C_P 56$, and the most significant bit $SR_3$ becomes H in the middle of the 7th shift, and the output signal 58 of the shift register 57 becomes H.

Since the output signal 58 is set in the first flip-flop 59 at the leading edge of the clock signal $C_P$56, the output signal 60 thereof becomes H at the 8th shift, as shown in line (13) in FIG. 12, and is inputted to the input terminal B of all of the adders 54. On the other hand, the least significant bit $DR_0$ of the data register 52 also becomes H at the 8th shift and is inputted to the input terminal A of all the adders 54. As a result, the output signal 55 at the addition output terminal E of all of the adders 54 becomes L, though the output signal 61 of the carrier output terminal $C_r$ becomes H. This output signal 61 is set in the second flip-flop at the leading edge of the next clock signal $C_N$51 and the output signal 63 shown in line (15) in FIG. 12 is inputted to the input terminal C of all the adders 54. Therefore, the output signal 55 of the addition output terminal Σ of all the adders 54 becomes H and is shifted on the shift register 57.

Since the operation explained above is repeated periodically, the data shown in FIG. 12 will move around in the data register 52 and the shift register 57. By adding the carrier output signal 61 of all of the adders 54, which is generated at this time, to the AND gate and by fetching it using the timing signal 64, the output signal 66 in a fixed period, as shown in line (16) in FIG. 12, can be obtained.

The above explanation of the operation relates to a situation wherein one kind of digital data is converted to one frequency. To obtain two kinds of frequencies, different data are read and processed alternately from the memory 50. Therefore, it is desirable to double the number of bits of the shift register 57 to 8 bits and provide two AND gates and a timing signal so as to take out the predetermined frequency from the carrier output signal 61 of all the adders 54. By changing the bit length of the shift register 57 in this way, the frequency converter shown in FIG. 10 can generate multiple frequencies.

Figure 13:
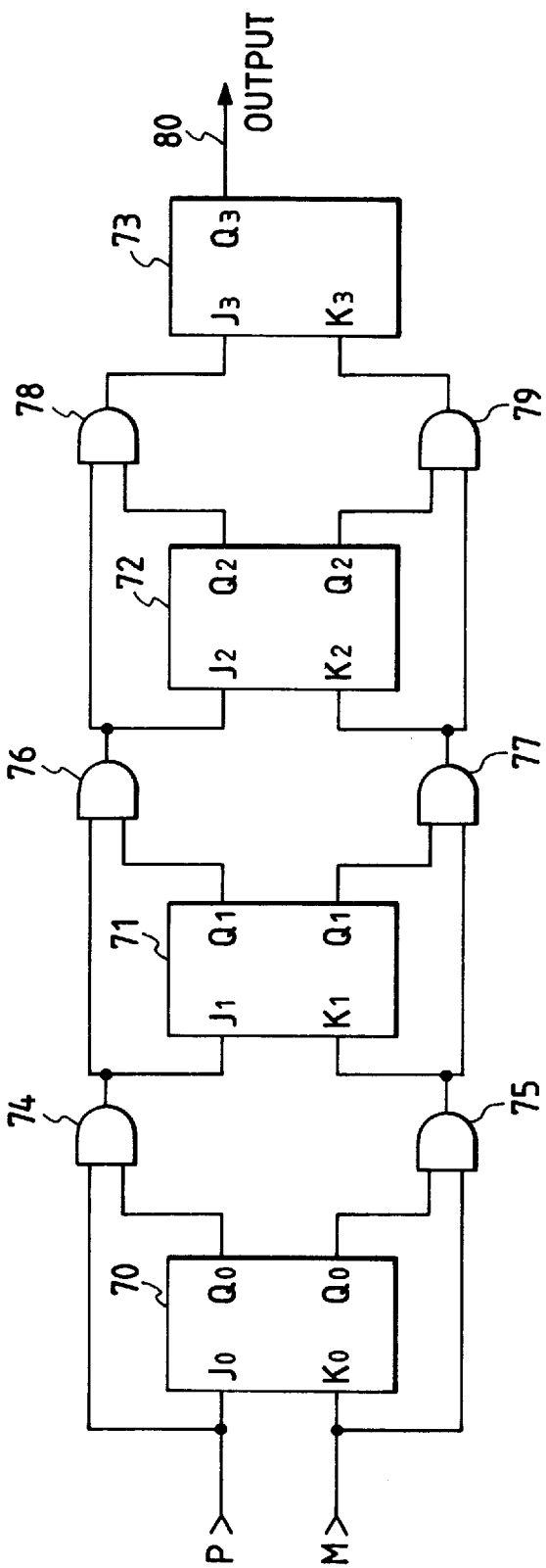
FIG. 13 is a block diagram of a frequency comparator.
Figure 14:
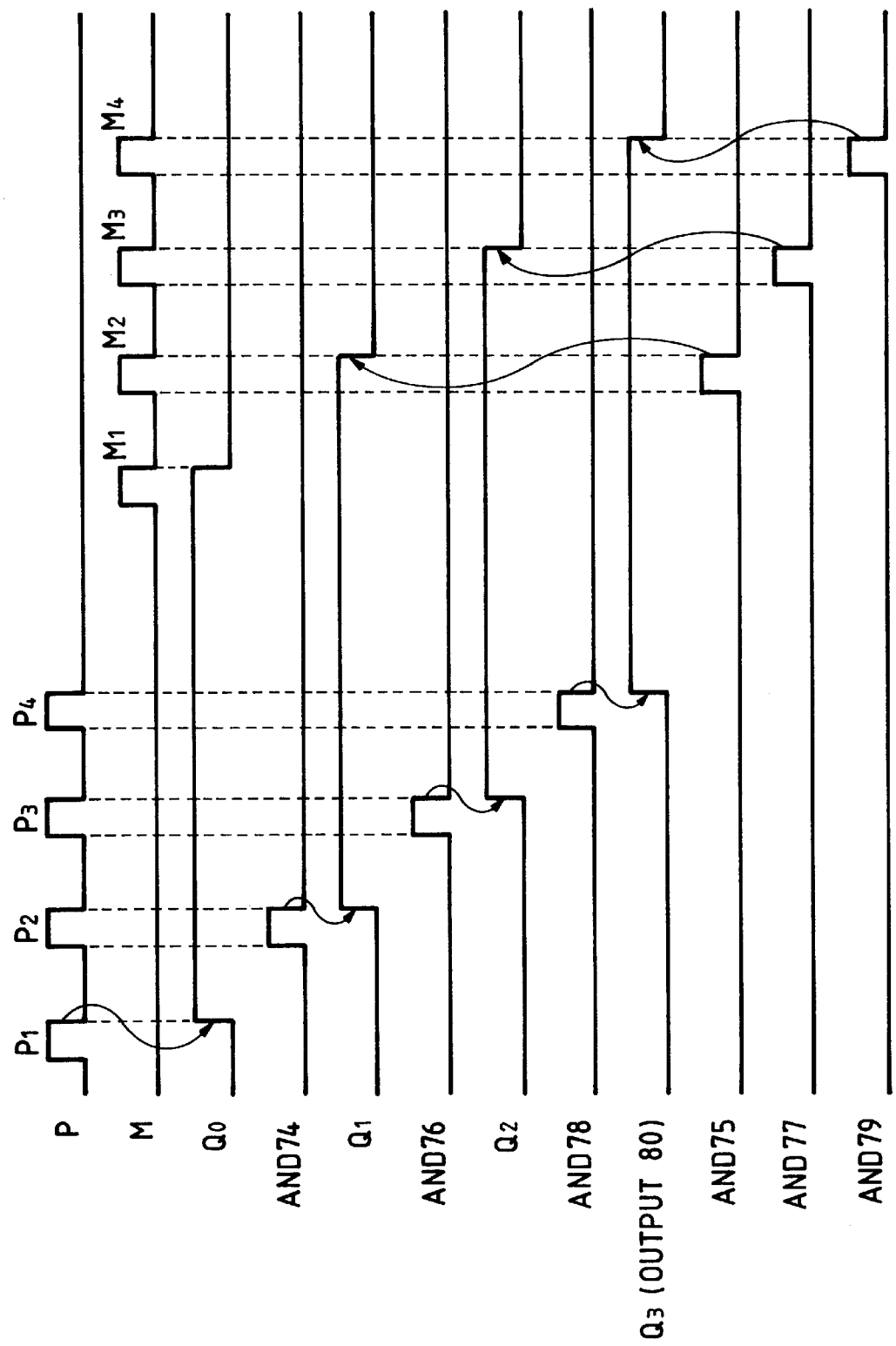
FIG. 14 is a timing chart of a frequency comparison operation.

Next, the frequency comparison operation shown in FIGS. 1 and 8 will be explained. A frequency comparator is shown in FIG. 13 and an operation timing chart is shown in FIG. 14. In FIG. 13, numerals 70 to 73 indicate flip-flops, 74 to 79 denote AND gates, P and M denote input frequency signals to be compared, and 80 denotes an output signal of the frequency comparison result.

For example, when the P signal is inputted, it inverts and operates that one of the flip-flops 70 to 73 which is closest to the input to Q=H, and when the M signal is inputted inversely, it inverts and operates that one of the flip-flops 70 to 73 which are at Q=H and closest to the input to Q=L.

When the input signal P is inputted continuously as shown in FIG. 14, the flip-flop 70 operates in synchronization with the trailing edge of the first pulse $P_1$ of the signal P, and $Q_0$ becomes H; when the second pulse $P_2$ is inputted, the flip-flop 71 operates in synchronization with the trailing edge of the output of the AND gate 74, and $Q_1$ becomes H; when the third pulse P3 is inputted, the flip-flop 72 operates in synchronization with the trailing edge of the output of the AND gate 76, and $Q_2$ becomes H; and, when the fourth pulse $P_4$ of the signal P is inputted, the flip-flop 73 operates in synchronization with the trailing edge of the output of the AND gate 78 and $Q_3$ becomes H.

When the input signal M is inputted continuously, the flip-flop 70 operates in synchronization with the trailing edge of the first pulse $M_1$ of the signal M, and $Q_0$ is changed from H to L; when the second pulse $M_2$ is inputted, the flip-flop 71 operates in synchronization with the trailing edge of the AND gate 75, and $Q_1$ is changed from H to L; when the third pulse $M_3$ is inputted, the flip-flop 72 operates in synchronization with the trailing edge of the AND gate 77, and $Q_2$ is changed from H to L; and, when the fourth pulse $M_4$ is inputted, the flip-flop 73 operates in synchronization with the trailing edge of the AND gate 79 and $Q_3$ is changed from H to L.

As mentioned above, when the number of pulses is large, the output state of the flip-flop in the subsequent stage can be inverted, and when P>M, $Q_3$ of the flip-flop $FF_3$ becomes H, the output signal 80 of the frequency comparison result becomes H. When P<M, the output signal 80 becomes L.

Figure 15:
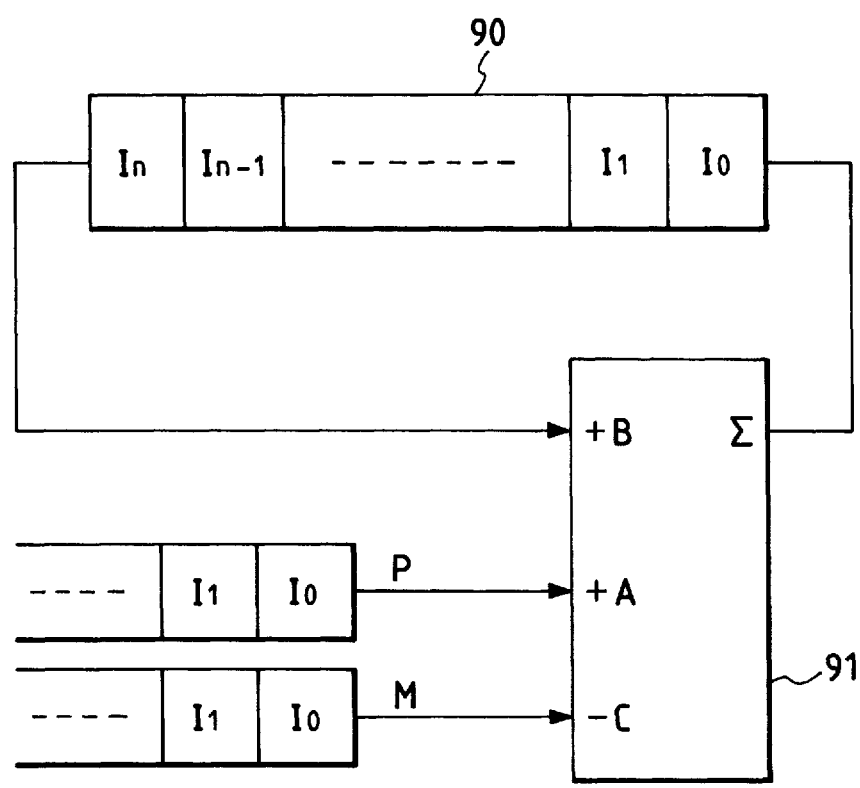
FIG. 15 is a diagram showing a multi-frequency comparison operation.

When a multi-frequency is compared, the constitution shown in FIG. 15 is used. In FIG. 15, numeral 90 indicates a shift register having the number of bits equivalent to a length of 4 bits, which is equivalent to the flip-flops 70 to 73 shown in FIG. 13, and 91 indicates an adder having a function for allowing data in the shift register 90 to perform the same operation as the inversion of the flip-flops 70 to 73 shown in FIG. 13.

A symbol $I_n$ indicates a time slot in which 4 bits are grouped and the slot inputs the signal P to the +A terminal of the adder 91 and inputs the signal M to the –C terminal. It is assumed that P>M.

The frequency comparison operation compares the presence or absence of a pulse, so that P=H and M=L in this state. Since the sign inversion signal H of M is inputted to the –C terminal and added, the carrier output $C_r$ becomes H and this value is added to the $I_0$ slot of the shift register 90.

The data of this $I_0$ slot moves around in the shift register, is inputted to the +B terminal of the adder 91 at the $I_0$ slot in the next period, and is added together with the P input and the M input, so that the carrier output $C_r$ of the adder becomes H also in this case and the data of the same value as the previous one moves around on the shift register 90.

When P<M, a signal L in which the signs of P=L and M=H are inverted is added, so that the carrier output $C_r$ becomes L, that is, is subtracted and the value is added to the $I_0$ slot of the shift register 90. Namely, L moves around in the shift register 90.

When P=M=H, a signal L in which the signs of P=L and M=H are inverted is added. However, the value of the carrier output $C_r$ varies with the data of the ID slot which moves around in the shift register 90. When the data of the $I_0$ slot is L, the carrier output $C_r$ also becomes L, and when the data of the $I_0$ slot is H, the carrier output $C_r$ becomes H. Namely, the data of the $I_0$ slot moving around in the shift register 90 will not be changed.

When P=M=L, a signal H in which the signs of P=L and M=H are inverted is added. Also in this case, the value of the carrier output $C_r$ varies with the data of the $I_0$ slot which moves around on the shift register 90. When the data of the $I_0$ slot is L, the carrier output $C_r$ also becomes L, and when the data of the $I_0$ slot is H, the carrier output $C_r$ becomes H. Namely, the data of the $I_0$ slot moving around in the shift register 90 will not be changed.

The frequency comparison operation is performed by this method.

Figure 16:
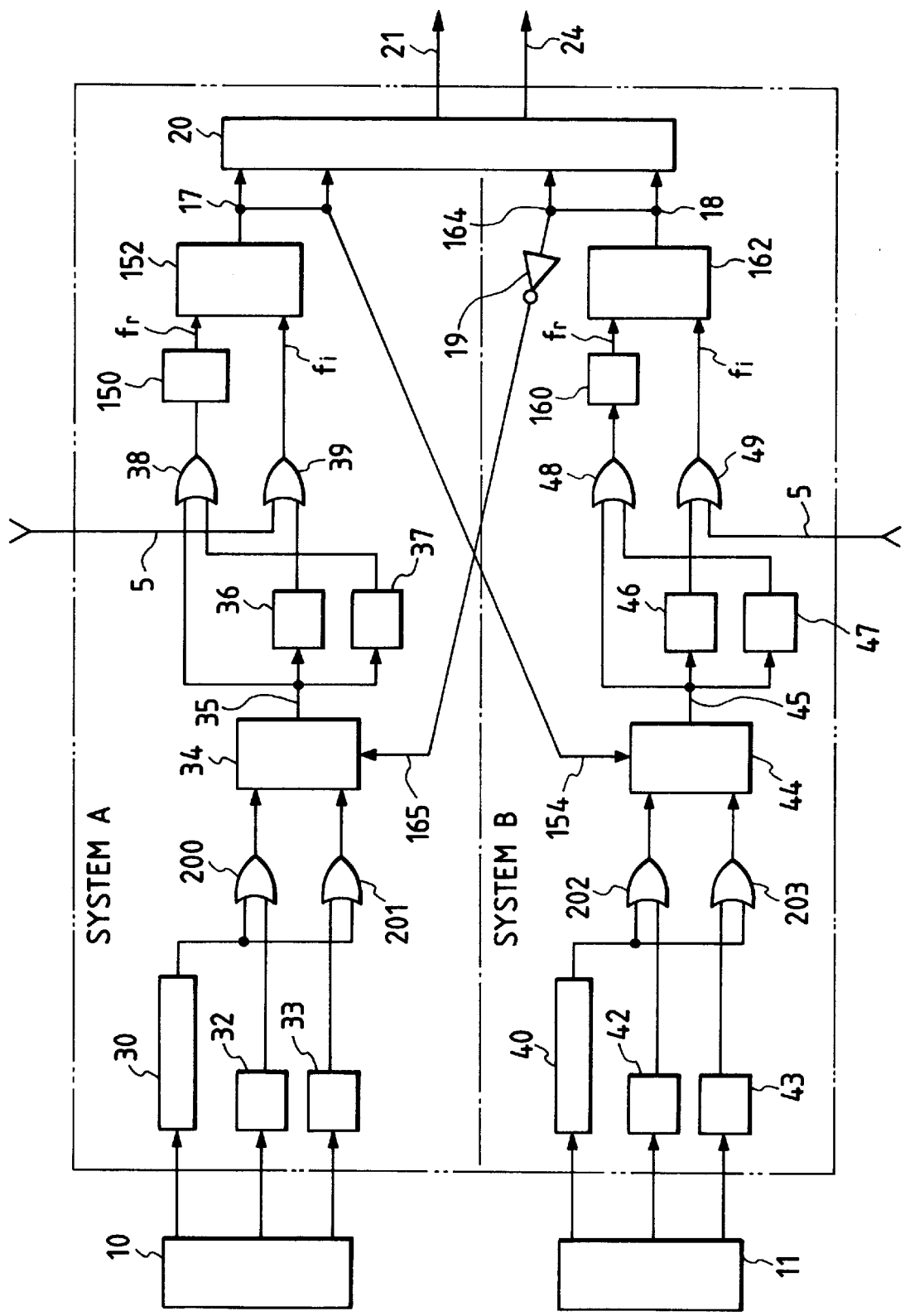
FIG. 16 is a schematic diagram of another embodiment of the present invention.

FIG. 16 shows another embodiment of the present invention. According to the embodiment shown in FIG. 8, the system A has two memories 30 and 31 in the logic circuit 15 and the output data 35 is obtained by selecting data outputted from each memory via the switching circuit 34. Also, the system B has two memories 40 and 41 in the logic circuit 16 and the output data 45 is obtained by selecting data outputted from each memory via the switching circuit 44.

A difference in the embodiment of the present invention shown in FIG. 16 from that shown in FIG. 8 is that each of the memories in the logic circuits 15 and 16 of the systems A and B comprises one memory and the CRC data allocated at the last address of each memory is stored in another area and switched by the aforementioned failure detection signal.

Namely, the CRC data $D_{CRCX1}$, which is calculated by the microcomputer 10 using the same method as the aforementioned embodiment, is stored in the memory 32 of the system A, and $D_{CRCX2}$ is stored in the memory 33, and $D_{CRCY1}$ which is calculated by the microcomputer 11 is stored in the memory 42 of the system B, while $D_{CRCY2}$ is stored in the memory 43.

In the system A, the data read from the memory 30 is added to the CRC data 32 by the logic circuit 200, and the data read from the memory 30 is added to the CRC data 33 by the logic circuit 201, and the resulting outputs are inputted to the switching circuit 34.

In the system B, the data read from the memory 40 is added to the CRC data 42 by the logic circuit 202, and the data read from the memory 40 is added to the CRC data 43 by the logic circuit 203, and the resulting outputs are inputted to the switching circuit 44. The switching timing for the switching circuits 34 and 44 is the same as the aforementioned.

In the embodiment of the present invention shown in FIG. 16, the number of memories requiring the maximum number of gates can be reduced by half, so that this arrangement not only greatly contributes to improvement of the reliability, but also has a great effect on reduction of power consumption of the LSI.

Figure 17:
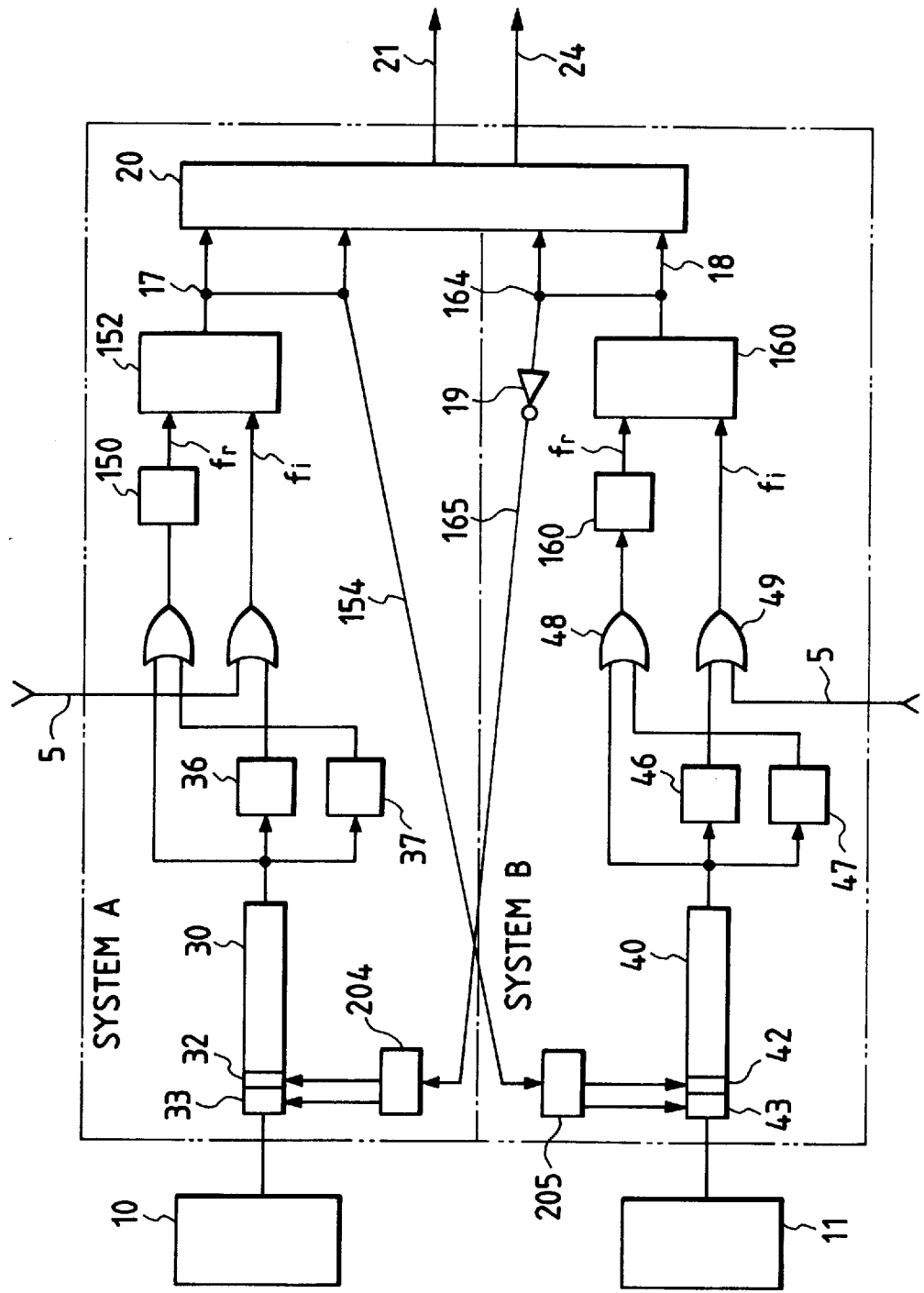
FIG. 17 is a schematic diagram of another embodiment of the present invention.

FIG. 17 shows another embodiment of the present invention. FIG. 17 also shows an example in which each of the systems A and B comprises only one built-in memory. A difference between FIG. 8 and FIG. 16 is that, although the output of each memory is switched by the switching circuit in FIG. 8, the CRC data is switched in FIG. 16. However, in FIG. 17, the CRC data $D_{CRCX1}$, which is calculated by the microcomputer 10 using the same method as the aforementioned embodiment, is stored in the memory area 32 of the system A and $D_{CRCX2}$ is stored in the memory area 33, adjacent to the memory area 32. $D_{CRCY1}$, which is calculated by the microcomputer 11, is stored in the memory area 42 of the system B and $D_{CRCY2}$ is stored in the memory area 43 adjacent to the memory area 42, in the memory area 40.

The CRC data is switched by the switching circuits 204 and 205 using the failure detection signal 154 and the sign inversion failure detection signal 165. Also, in the embodiment of the present invention shown in FIG. 17, the number of memories requiring the maximum number of gates can be reduced by half, so that this arrangement not only greatly contributes to improvement of the reliability, but also has a great effect on reduction of power consumption of the LSI.

Figure 18:
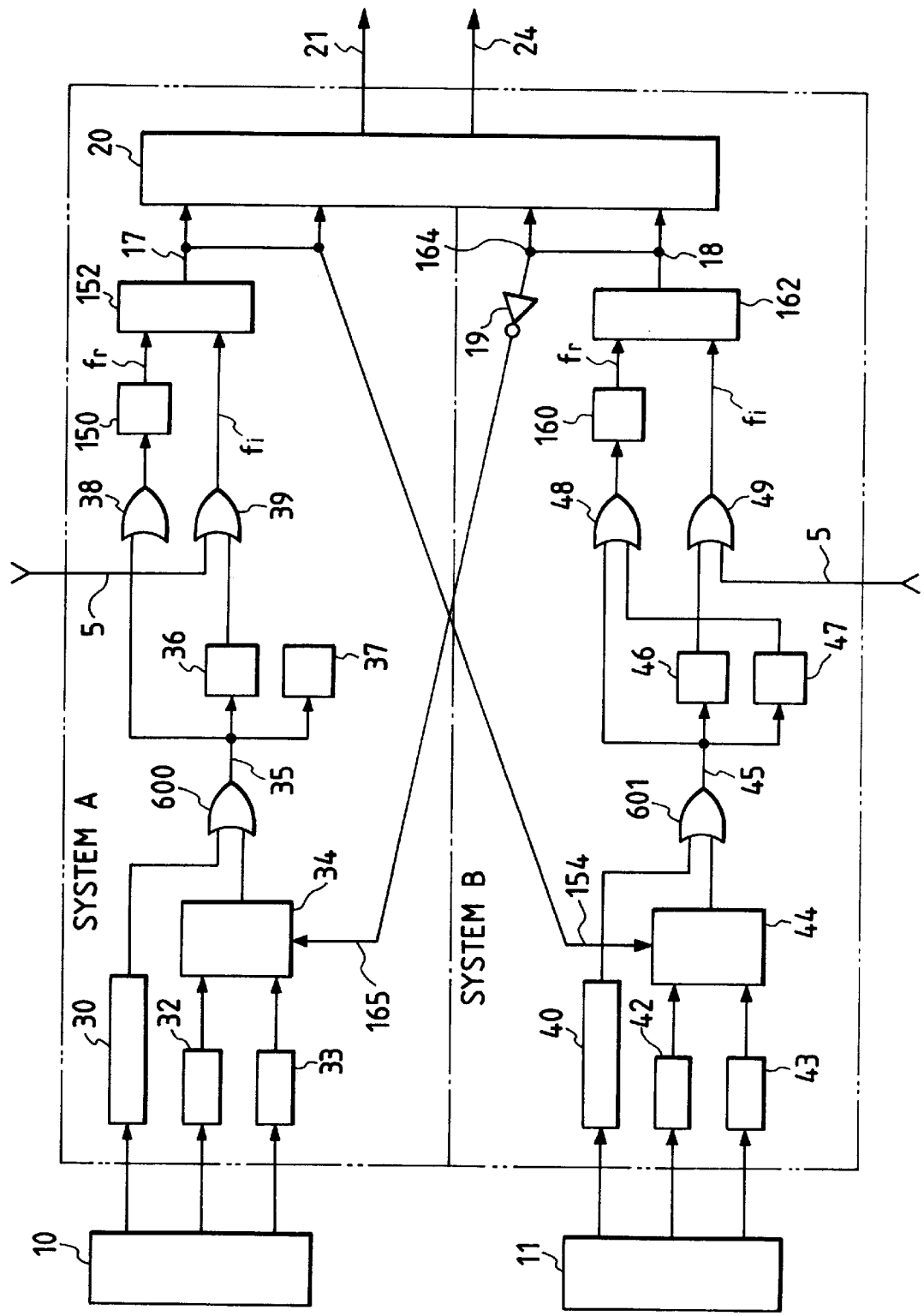
FIG. 18 is a schematic diagram of another embodiment of the present invention.

FIG. 18 shows another embodiment of the present invention. A difference from FIG. 16 is that the CRC data is switched by each switching circuit and then the output signal of each memory and the output signal of each switching circuit are added by the adder.

The switching circuit 34 of the system A switches the CRC data 32 and the CRC data 33 in response to the sign inversion failure detection signal 165 and the switching circuit 44 of the system B switches the CRC data 42 and the CRC data 43 in response to the failure detection signal 154. Also, in the embodiment of the present invention shown in FIG. 18, the number of memories requiring the maximum number of gates can be reduced by half and furthermore the number of adders also can be reduced by half, so that the arrangement not only greatly contributes to improvement of the reliability, but also has a great effect on reduction of power consumption of th e LSI.

Figure 19:
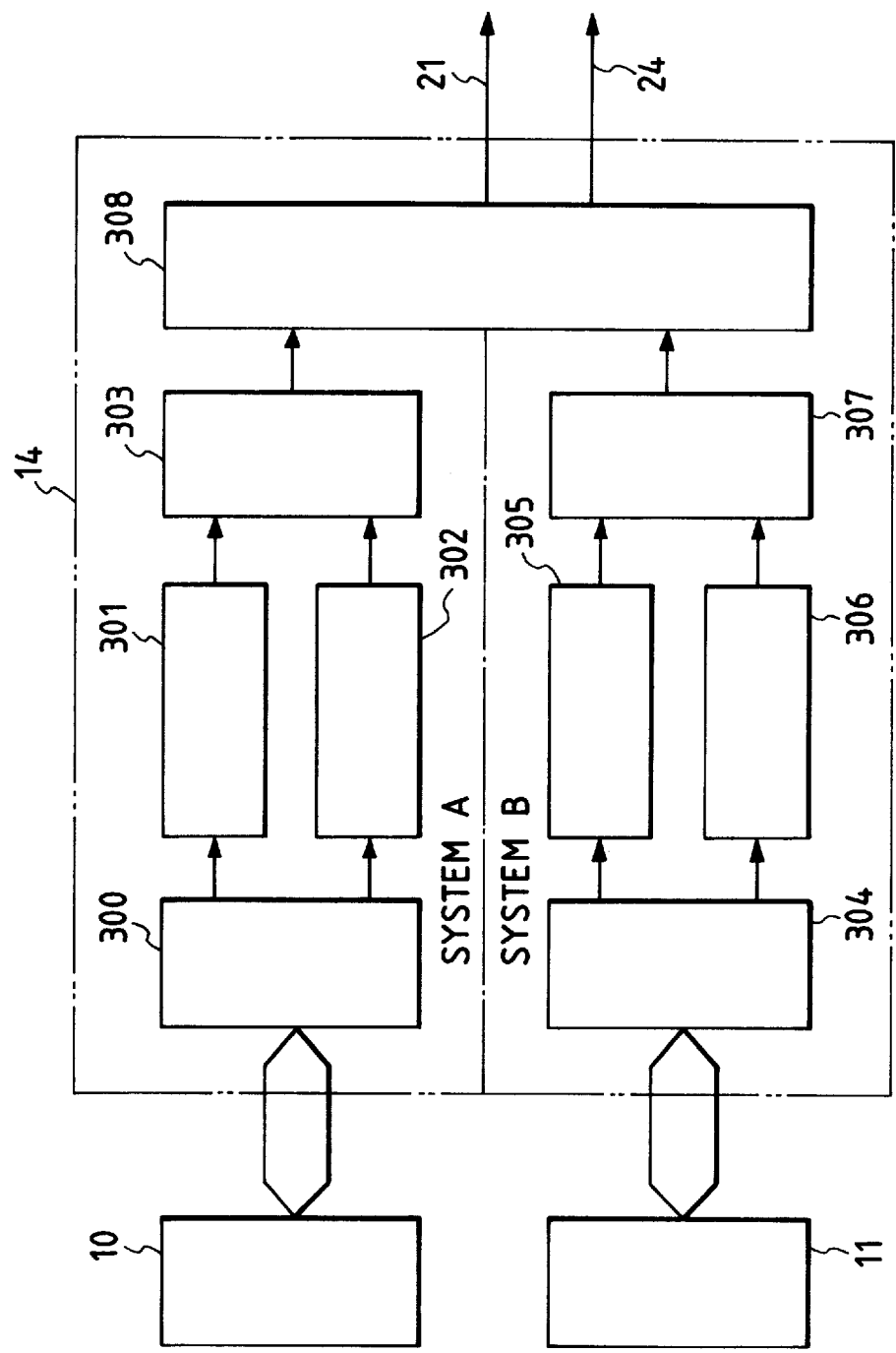
FIG. 19 is a diagram of the LSI layout of the present invention.

FIG. 19 is a schematic layout diagram of the embodiment of the present invention shown in FIG. 8. Numeral 300 indicates a bus interface for transmitting and receiving data to or from the microcomputer 10, 301 and 302 denote memories for storing data, 303 denotes a processor, such as a memory switching circuit, a frequency converter, and a frequency comparator, 304 denotes a bus interface for transmitting and receiving data to or from the microcomputer 11, 305 and 306 denotes memories for storing data, 307 denotes a processor, such as a memory switching circuit, a frequency converter, and a frequency comparator, and 308 denotes a matcher for an output signal of the processor 303 of the system A and an output signal of the processor 307 of the system B.

When the systems A and B are duplicated and arranged separately from each other, an effect of a failure of one system does not have an effect on the other system, for example, although one system is broken down, it is prevented from outputting a signal as if it is normal. When the circuits constituting the matcher unit are arranged separately from each other and the conductor interval is extended, an effect in which a failure of one of the matchers affects the other matchers, and in which a command signal is not outputted, or outputted can be prevented.

Figure 20:
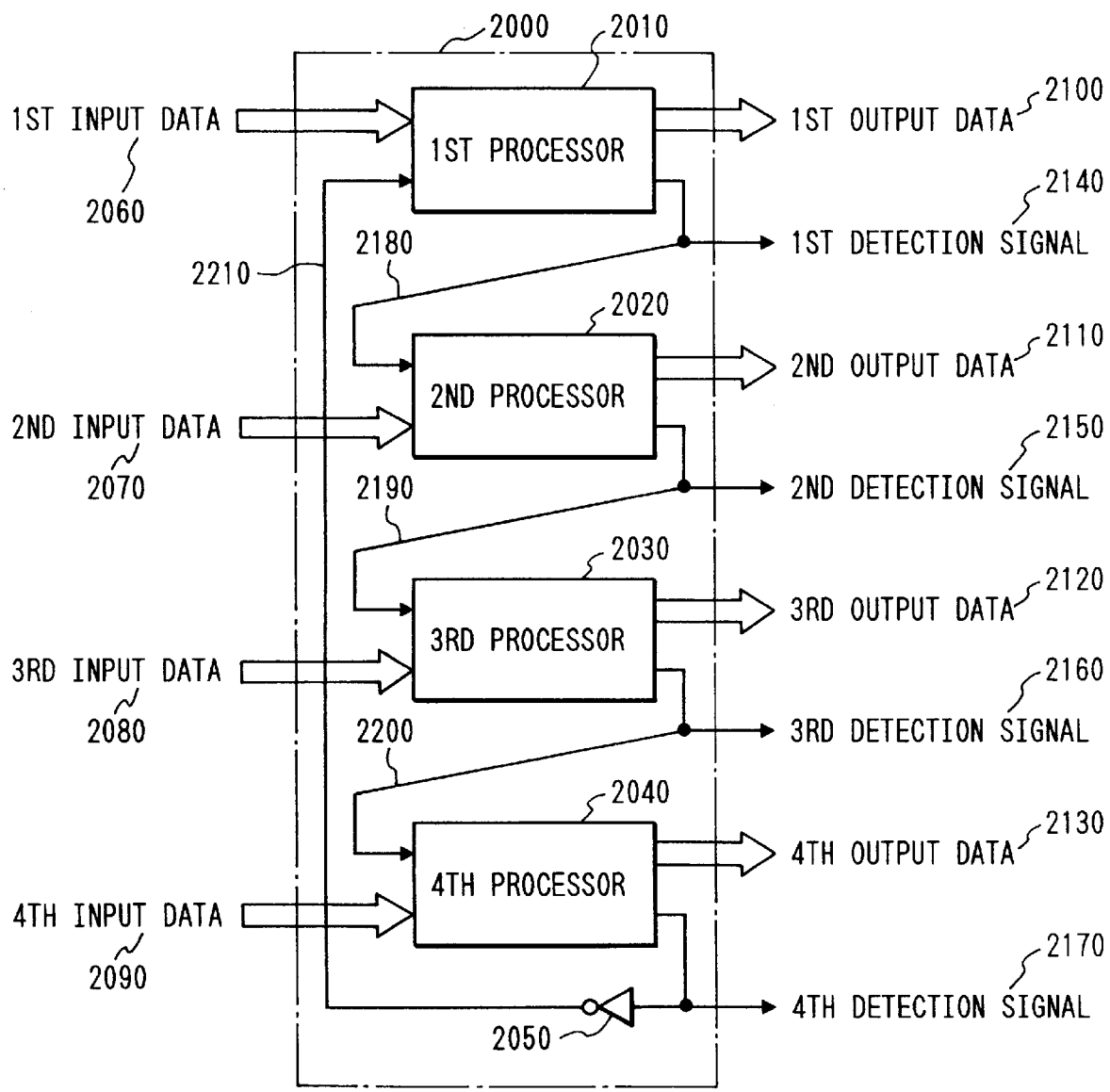
FIG. 20 is a schematic diagram of another embodiment of the present invention.

Another embodiment of the present invention is shown in FIG. 20 and will be explained hereunder. FIG. 20 is a drawing showing an embodiment in which a plurality of processors, which are the same as the one shown in FIG. 2, are provided.

Numeral 2000 indicates a controller, 2010 denotes a first processor for inputting and processing first input data and outputting first output data 2100 and a first detection signal 2140, 2020 denotes a second processor for outputting second output data 2110 and a second detection signal 2150, 2030 denotes a third processor for outputting third output data 2120 and a third detection signal 2160, 2040 denotes a fourth processor for outputting fourth output data 2130 and a fourth detection signal 2170, 2180 denotes a first connection for transmitting the first detection signal 2140 outputted from the first processor 2010 to the second processor 2020, 2190 denotes a second connection for transmitting the second detection signal 2150 outputted from the second processor 2020 to the third processor 2030, 2200 denotes a third connection for transmitting the third detection signal 2160 outputted from the third processor 2030 to the fourth processor 2040 and a fourth connection 2210 for is provided transmitting a fourth detection signal 2170 outputted from the fourth processor 2040 via a sign inverter 2050 to the first processor 2010.

First input data 2060, second input data 2070, third input data 2080, and fourth input data 2090 are data generated and supplied by the microcomputer or read from a memory.

As to the first input data 2060, there are cases in which this data is used for producing first output data 2100 and check data for checking the above data and cases in which no check data is produced, and check data is generated by the processing of the first processor 2010, and a first detection signal 2140 is generated.

Also, as to the second input data 2070, there are cases in which this data is used for producing second output data 2110 and check data for checking the above data and cases in which no check data is produced, and check data is generated by processing of the second processor 2020, and the second detection signal 2150 is generated.

Also, as to the third input data 2080, there are cases in which this data is used for producing third output data 2120 and check data for checking the above data and cases in which no check data is produced, and check data is generated by processing of the third processor 2030, and the third detection signal 2160 is generated.

Also, as to the fourth input data 2090, there are cases in which this data is used for processing fourth output data 2130 and check data for checking the above data and cases in which no check data is produced, and check data is generated by processing of the fourth processor 2040, and the fourth detection signal 2170 is generated.

The first processor 2010 processes the first input data 2060, which is sequentially inputted by a dedicated serial processing type ring processor, or fetches the data in the microcomputer in parallel and performs parallel processing.

The second processor 2020 also processes the second input data 2070, which is sequentially inputted by a dedicated serial processing type ring processor, or fetches the data in the microcomputer in parallel and performs parallel processing.

The third processor 2030 also processes the third input data 2080, which is sequentially inputted by a dedicated serial processing type ring processor, or fetches the data in the microcomputer in parallel and performs parallel processing.

The fourth processor 2040 also processes the fourth input data 2090, which is sequentially inputted by a dedicated serial processing type ring processor, or fetches the data in the microcomputer in parallel and performs parallel processing.

The first detection signal 2140 indicates whether the first processor 2010 operates normally or abnormally, and the second detection signal 2150 indicates whether the second processor 2020 operates normally or abnormally. The third detection signal 2160 indicates whether the third processor 2030 operates normally or abnormally, and the fourth detection signal 2170 indicates whether the fourth processor 2040 operates normally or abnormally. These detection signals are alternating signals which alternate in a predetermined period, respectively.

These detection signals can be used also as a signal for indicating whether the check results of the contents of input data are correct or wrong. Namely, the first processor 2010 outputs the processing result for checking the content of the input data 2060 as the detection signal 2140, the second processor 2020 outputs the processing result for checking the content of the input data 2070 as the detection signal 2150, the third processor 2030 outputs the processing result for checking the content of the input data 2080 as the detection signal 2160, and the fourth processor 2040 outputs the processing result for checking the content of the input data 2090 as the detection signal 2170.

The output data 2100 of the first processor 2010, the output data 2110 of the second processor 2020, the output data 2120 of the third processor 2030, and the output data 2130 of the fourth processor 2040 are outputted to another device so as to control it.

Before outputting the output data to another device, by using an output portion, for example, for detecting a match in the first output data 2100, the second output data 2110, the third output data 2120, and the fourth output data 2130, by detecting a match in the first output data 2100 and the second output data 2110, by detecting a match in the third output data 2120 and the fourth output data 2130, or furthermore by outputting $f_{in}$ al output data using the first detection signal 2140, the second detection signal 2150, the third detection signal 2160, and the fourth detection signal 2170, another device to be controlled is controlled.

The processing of a controller 2000 having the aforementioned constitution is as follows:

The first input data 2060 is inputted to the first processor 2010, the second input data 2070 is inputted to the second processor 2020, the third input data 2080 is inputted to the third processor 2030, and the fourth input data 2090 is inputted to the fourth processor 2040, and respective operations are executed in these processors.

The first output data 2100 and the first detection signal 2140 are outputted from the first processor 2010.

The first detection signal 2140 is inputted to the second processor 2020 and processed together with the second input data 2070 and the second output data 2110 and the second detection signal 2150 are generated. The second detection signal 2150 is inputted to the third processor 2030 and processed together with the third input data 2080 and the third output data 2120 and the third detection signal 2160 are generated. The third detection signal 2160 is inputted to the fourth processor 2040 and processed together with the fourth input data 2090 and the fourth output data 2130 and the fourth detection signal 2170 are generated. Finally, the fourth detection signal 2170 is inverted in sign by the sign inverter 2050 and inputted to the first processor 2010.

When the first detection signal 2140 of by the first processor 2010 is an H-level signal, the second detection signal 2150 of the second processor 2020 also becomes an H-level signal, and when the first detection signal 2140 is a L level signal, the second detection signal 2150 of the second processor 2020 also becomes an L level signal.

The outputs of the detection signals of all the processors are assumed as L level first. Therefore, the sign inversion signal 2210 of the fourth detection signal 2170 of the fourth processor 2040 becomes an H-level signal and is inputted to the first processor 2010.

As a result, when processed by the first processor 2010, the output level of the first detection signal 2140 becomes H, and when processed by the second processor 2020 next, the output level of the second detection signal 2150 becomes H, and when processed by the third processor 2030 next, the output level of the third detection signal 2160 becomes H, and when processed by the fourth processor 2040 $f_{in}$ ally, the output level of the fourth detection signal 2170 becomes H.

Since the sign of the output of the fourth detection signal 2170 is inverted by the sign inverter 2050, the output level of the sign inversion signal 2210 is changed from H to L.

Therefore, the output level of the first detection signal 2140 of the first processor 2010 is changed from H to L, and the output level of the second detection signal 2150 of the second processor 2020 is changed from H to L, and the output level of the third detection signal 2160 of the third processor 2030 is changed from H to L next, and the output level of the fourth detection signal 2170 of the fourth processor 2040 is changed from H to L finally.

Since the sign of the output of the fourth detection signal 2170 is inverted by the sign inverter 2050, the output level of the sign inversion signal 2210 is changed from H to L and returned to the initial state.

Since the detection signals are connected in a loop from the first processor to the fourth processor as mentioned above, the first input data to the fourth input data and the first processor to the fourth processor are all normal. When they operate correctly, the first detection signal 2140 to the fourth detection signal 2170 become alternating signals which alternate in a fixed period, and when one of the processors breaks down and the corresponding detection signal is fixed at H or L, the alternation of the detection signals constituting the loop is stopped.

Therefore, it is desirable to monitor a failure detection signal of the loop and take an emergency action at the time the alternation stops. If all the failure detection signals are monitored, a broken-down processor can be detected and the failure can be analyzed more quickly.

In FIG. 20, an embodiment having four processors is shown. However, even if processors in an optional number are provided, it is desirable to connect a failure detection signal in the same way and there are no restrictions on the number of processors.

Figure 21:
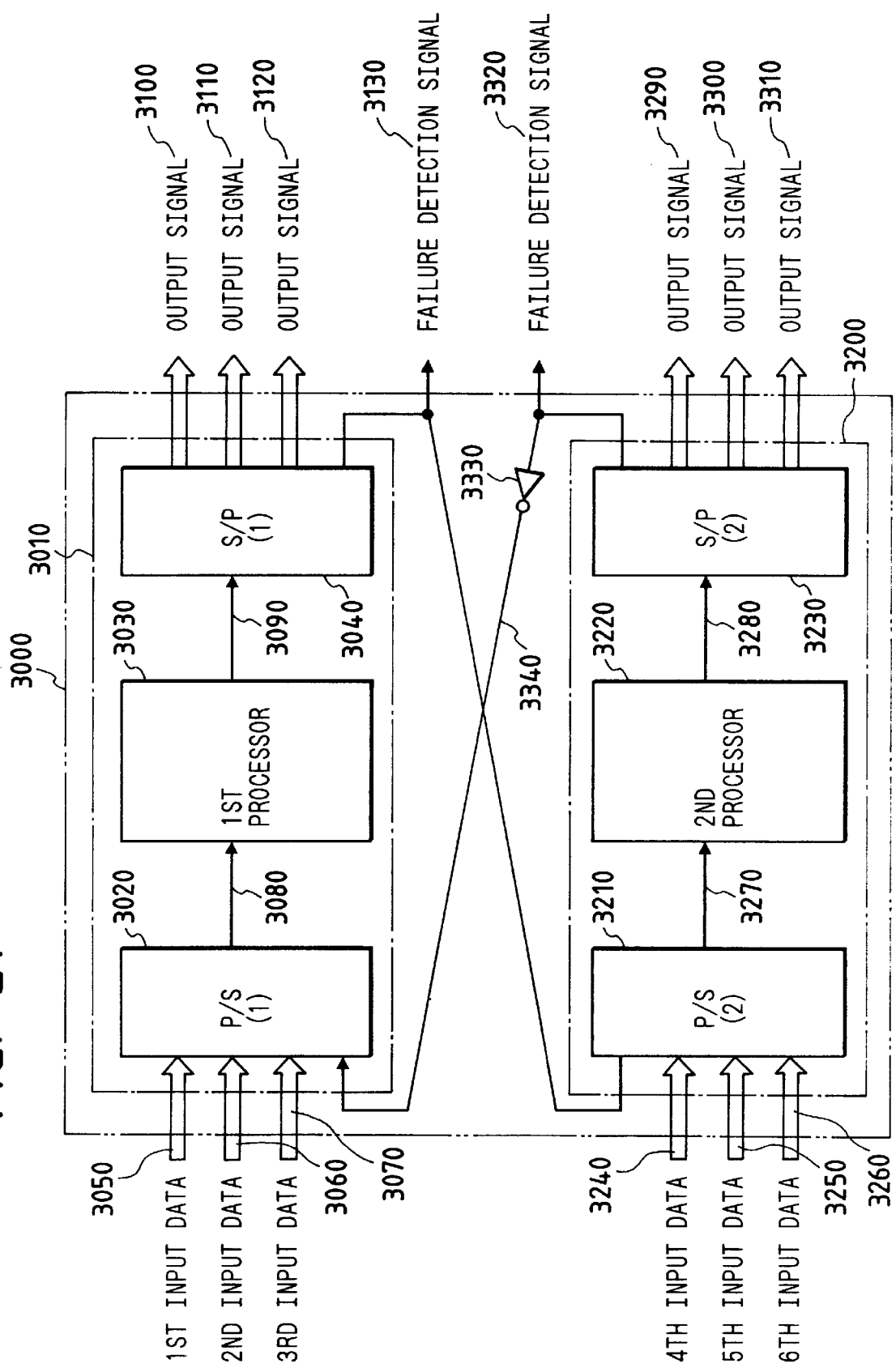
FIG. 21 is a schematic diagram of another embodiment of the present invention.

FIG. 21 is a drawing showing another embodiment of the present invention. FIG. 21 is directed to an embodiment in which the processors are shared, and the input portions comprise a time division operation type parallel-serial converter, and the output portions comprise a time division operation type serial-parallel converter.

A controller 3000 comprises a first control circuit 3010, including a time division operation type parallel-serial converter 3020, a first processor 3030, and a time division operation type serial-parallel converter 3040, and a second control circuit 3200 including a time division operation type parallel-serial converter 3210, a second processor 3220, and a time division operation type serial-parallel converter 3230. A failure detection signal 3130 of the first control circuit 3010 is inputted to the parallel-serial converter 3210 of the second control unit 3200, and a failure detection signal 3320 of the second control circuit 3200 is inverted in sign by a sign inverter 3330, and a sign inversion signal 3340 is inputted to the parallel-serial converter 3020 of the first control unit 3010.

First input data 3050, second input data 3060, and third input data 3070 are inputted to the parallel-serial converter 3020 of the first control circuit 3010, and fourth input data 3240, fifth input data 3250, and sixth input data 3260 are inputted to the parallel-serial converter 3210 of the second control circuit 3200.

It is assumed that the output levels of the failure detection signal 3130 of the first control circuit 3010 and the failure detection signal 3320 of the second control circuit 3130 are L at first.

The first input data 3050 is converted to a serial signal 3080 by the parallel-serial converter 3020 of the first control circuit 3010, processed by the first processor 3030, outputted as a serial output signal 3090, converted to a parallel signal by the serial-parallel converter 3040, and then outputted as an output signal 3100.

On the other hand, the fourth input data 3240 is converted to a serial signal 3270 by the parallel-serial converter 3210 of the second control circuit 3200, processed by the second processor 3220, outputted as a serial output signal 3280, converted to a parallel signal by the serial-parallel converter 3230, and then outputted as an output signal 3290.

In the same way, the second input data 3060 inputted to the first control circuit 3010 is processed by the first processor 3030 and outputted as an output signal 3110, and the fifth input data 3250 inputted to the second control circuit 3200 is processed by the second processor 3220 and outputted as an output signal 3300. The third input data 3070 inputted to the first control circuit 3010 is processed by the first processor 3030 and outputted as an output signal 3120, and the sixth input data 3260 inputted to the second control circuit 3200 is processed by the second processor 3220 and outputted as an output signal 3310.

Next, when the failure detection signal 3320 of the second control circuit 3200 is inverted in sign by the sign inverter 3330 and the sign inversion signal 3340 of H level is inputted to the parallel-serial converter 3020 of the first control circuit 3010, the failure detection signal 3130 of H level is outputted by the same operation as that mentioned above.

Since the failure detection signal 3130 of H level of the first control circuit 3010 is inputted to the parallel-serial converter 3210 of the second control circuit 3200, the failure detection signal 3320 of H level is outputted by the same operation as that mentioned above.

Since this failure detection signal 3320 of H level is inverted in sign by the sign inverter 3330 and the failure detection signal of L level is inputted to the parallel-serial converter 3020 of the first control circuit 3010, the failure detection signal 3130 of H level is outputted by the same operation as that mentioned above.

Therefore, when the first control circuit 3010 and input data thereto and the second control circuit 3200 and input data thereto are normal, the failure detection signal 3130 of the first control circuit 3010 and the failure detection signal 3320 of the second control circuit 3200 become alternating signals which alternate with a fixed period.

In FIG. 21, the first processor 3020 and the second processor 3210 may use a microcomputer. In this case, various operations can be selected by a program. For example, by a method for executing the failure detection process after the input data process or executing the input data process and the failure detection process in parallel, the same operation as that mentioned above can be realized.

Needless to say, by replacing the parallel-serial converter with a multiplexer and the serial-parallel converter with a demultiplexer, the same operation can be realized.

Figure 22:
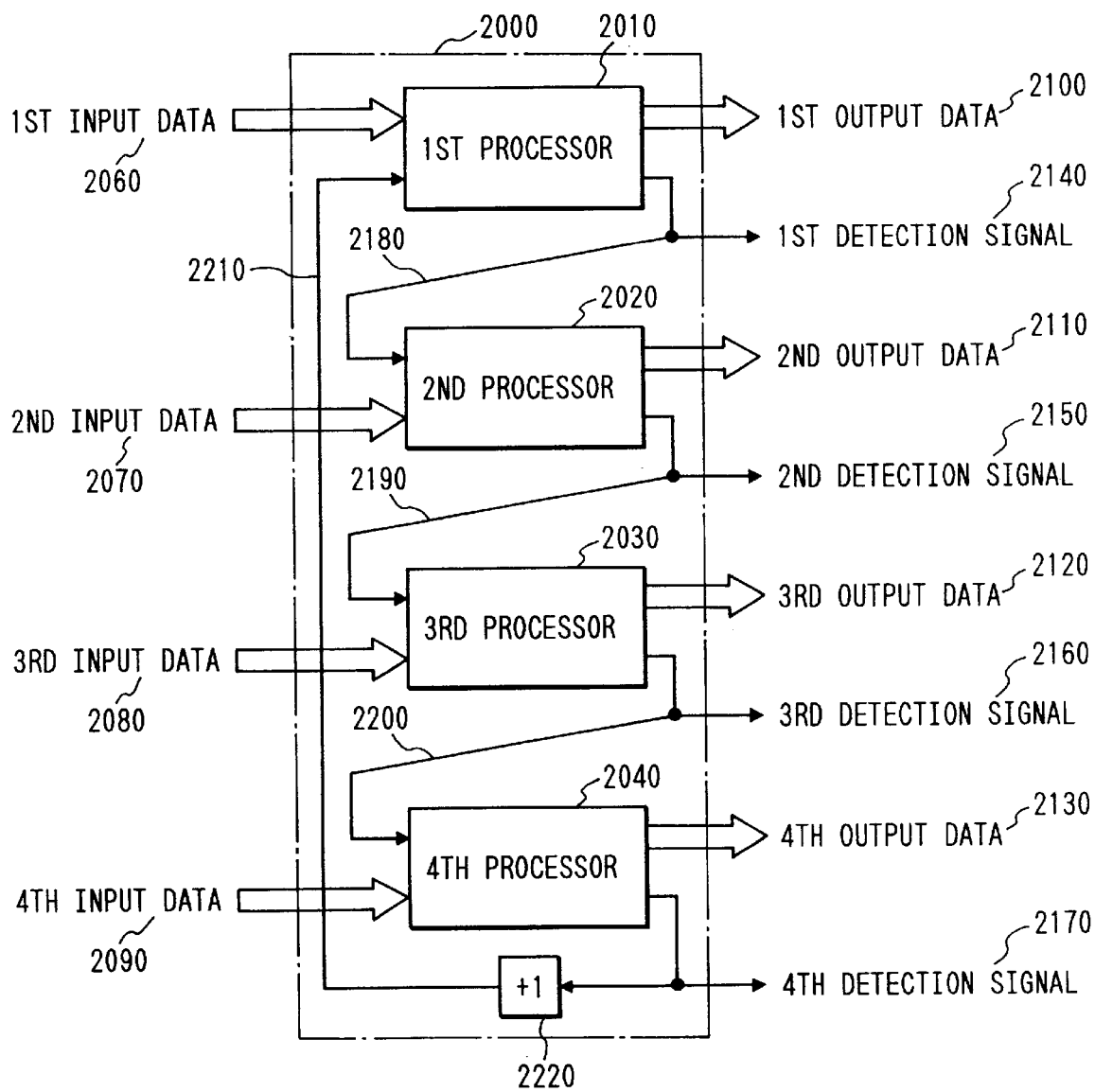
FIG. 22 is a schematic diagram of another embodiment of the present invention.

FIG. 22 is a drawing showing another embodiment of the present invention. As a main difference, in the embodiment shown in FIG. 22, the sign inverter 2050 in the embodiment shown in FIG. 20 is a 1-bit adder 2220. The elements are all the same, so that an explanation of the operations thereof will be omitted and the operation of the adder 2220 shown in FIG. 22 will be explained hereunder.

It is assumed that the first processor 2010, the second processor 2020, the third processor 2030, and the fourth processor 2040 constituting the controller 2000 are normal and that the output levels of the first detection signal 2140, the second detection signal 2150, the third detection signal 2160, and the fourth detection signal 2170 are L.

The first input data 2060 is inputted and processed by the first processor 2010 and outputted as the first detection signal 2140 of L level. This first detection signal 2140 is inputted to the second processor 2020, processed together with the second input data 2070, and outputted as the second detection signal 2150 of L level. This second detection signal 2150 is inputted to the third processor 2030, processed together with the third input data 2080, and outputted as the third detection signal 2160 of L level. This third detection signal 2160 is inputted to the fourth processor 2040, processed together with the fourth input data 2090, and outputted as the fourth detection signal 2170 of L level.

This fourth detection signal 2170 is inputted to the adder 2220 and added to H-level data, so that the output level of an output signal 2210 thereof becomes H and the signal is inputted to the first processor 2010.

Since this H-level output signal 2210 is processed together with the first input data 2060, the first detection signal 2140 becomes an H-level signal and hereafter by the same operation, the second detection signal 2150 of the second processor 2020 becomes an H-level signal, and the third detection signal 2160 of the third processor 2030 becomes an H-level signal, and the fourth detection signal 2170 of the fourth processor 2040 becomes an H-level signal.

When this fourth detection signal 2170 is inputted to the adder 2220 and added to H-level data, the output level of the output signal 2210 thereof becomes L. This output signal 2210 is inputted to the first processor 2010 and processed together with the first input data. Namely, it is returned to the initial state.

Therefore, when each unit of the controller 2000 is normal, the first detection signal 2140, the second detection signal 2150, the third detection signal 2160, and the fourth detection signal 2170 constituting a loop become alternating signals which alternate between the H level and L level with a fixed period, so that it is possible to provide a system in which one of the signals is monitored and when the alternation stops, emergency control is executed.

In FIG. 22, an example of four processors is shown similar to FIG. 20. However, even if processors in an optional number are provided, it is desirable to connect them in the same way and there are no restrictions on the number of processors.

Figure 23:
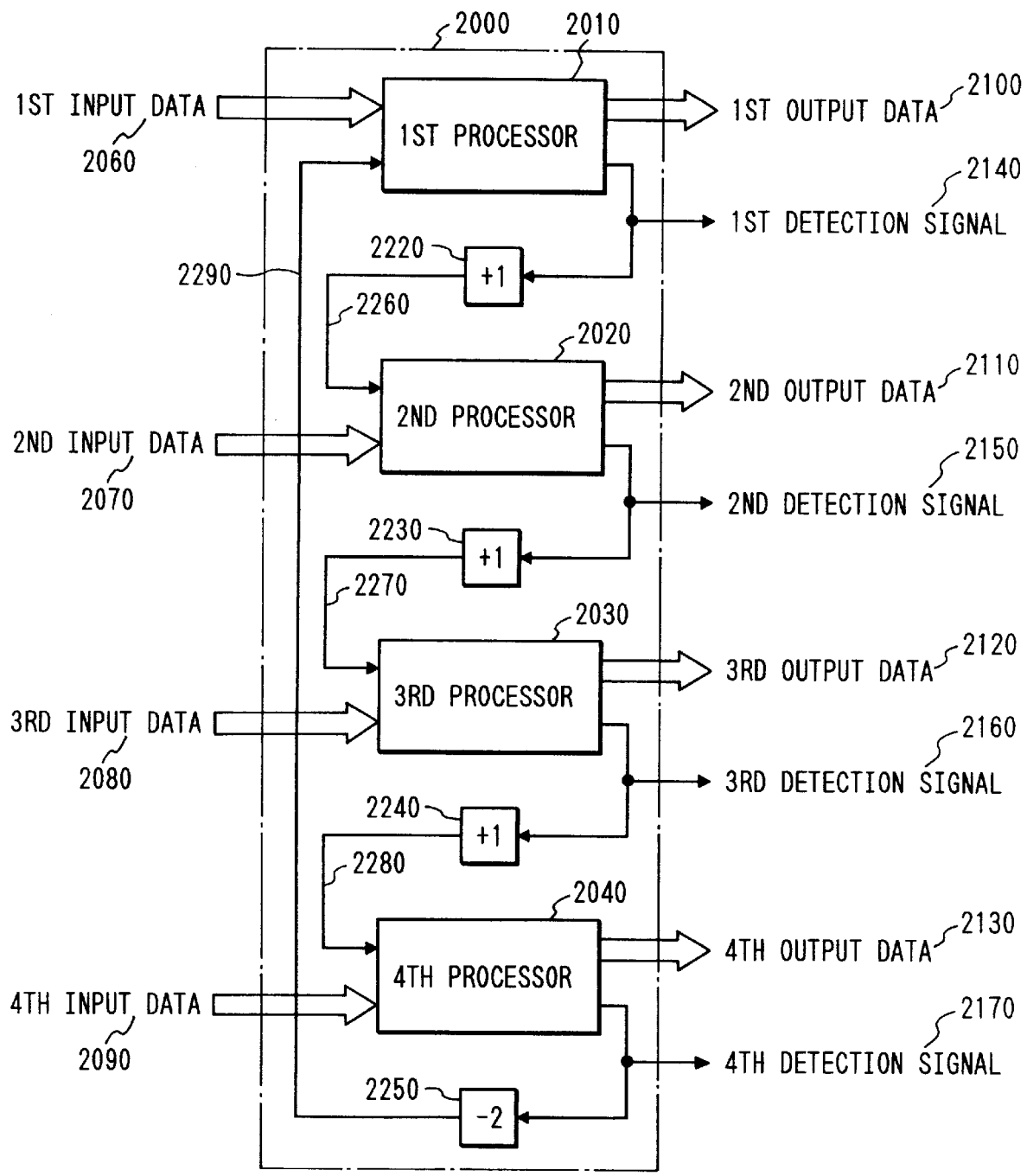
FIG. 23 is a schematic diagram of another embodiment of the present invention.

FIG. 23 is a drawing showing another embodiment of the present invention. A difference from FIG. 20 resides in the fact that, the embodiment shown in FIG. 23, 2-bit data of "0" "1" (indicating 1 in decimal) is added to a 2-bit detection signal of a processor and the addition output signal is inputted to the next processor and processed together with a signal inputted to the processor.

In FIG. 23, when the first processor 2010, the second processor 2020, the third processor 2030, and the fourth processor 2040, as well as the first adder 2220, the second adder 2230, the third adder 2240, and the first subtracter 2250, are normal, respectively, the output of the first detection signal 2140 indicates a status of "0" "0" (indicating 0 in decimal), and the output of the second detection signal 2150 is also "0" "0", and the output of the third detection signal 2160 is also "0" "0", and the output of the fourth detection signal 2170 is also "0" "0".

Since the first input data 2060 is inputted and processed by the first processor, the first output data 2100 and "0" to "0" of the first detection signal 2140 are outputted.

Since the output "0" "0" of the first detection signal 2140 is added to "0" "1" (indicating 1 in decimal) by the first adder 2220, the addition output 2260 becomes "0" "1".

Since "0" "1" of the addition output 2260 is inputted to the second processor 2020 and processed together with the second input data 2070, the second output data 2110 and "0" "1" of the second detection signal 2150 are outputted.

Since the output "0" "1" of the second detection signal 2150 is added to "0" "1" by the second adder 2230, the addition output 2270 becomes "1" "0" (indicating 2 in decimal).

Since "1" "0" of the addition output 2270 is inputted to the third processor 2030 and processed together with the third input data 2080, the third output data 2120 and "1" "0" of the third detection signal 2160 are outputted.

Since the output W 0 of the third detection signal 2160 is added to "0" "1" by the third adder 2240, the addition output 2280 becomes "1" "1" (indicating 3 in decimal).

Since "1" "1" of the addition output 2280 is inputted to the fourth processor 2040 and processed together with the fourth input data 2090, the fourth output data 2130 and "1" "1" of the fourth detection signal 2170 are outputted.

Since "1" "1" of the fourth detection signal 2170 is inputted to the first subtracter 2250 and "1" "0" (indicating 2 in decimal) is subtracted from "1" "1", the subtraction output 2290 becomes "0" "1".

Since "0" "1" of the subtraction output 2290 is inputted to the first processor 2010 and processed together with the first input data 2090, the first output data 2100 and "0" "1" of the first detection signal 2140 are outputted.

Since "0" "1" of the first detection signal 2140 is added to "0" "1" by the first adder 2220, the addition output 2260 becomes "1" "0" (indicating 2 in decimal).

Since "1" "0" of the addition output 2260 is inputted to the second processor 2020 and processed together with the second input data 2070, the second output data 2110 and "1" "0" of the second detection signal 2150 are outputted.

Since "1" "0" of the second detection signal 2150 is added to "0" "1" by the second adder 2230, the addition output 2270 becomes "1" "1" (indicating 3 in decimal).

Since "1" "1" of the addition output 2270 is inputted to the third processor 2030 and processed together with the third input data 2080, the third output data 2120 and "1" "1" of the third detection signal 2160 are outputted.

Since "1" "1" of the third detection signal 2160 is added to "0" "1" by the third adder 2240, the addition output 2280 becomes "0" "0" (indicating 0 in decimal).

Since "0" "0" of the addition output 2280 is inputted to the fourth processor 2040 and processed together with the fourth input data 2090, the fourth output data 2130 and "0" "0" of the fourth detection signal 2170 are outputted.

Since "0" "0" of the fourth detection signal 2170 is inputted to the first subtracter 2250 and "1" "0" is subtracted, the subtraction output 2290 becomes "1" "0" (indicating 2 in decimal).

Since "1" "0" of the subtraction output 2290 is inputted to the first processor 2010 and processed together with the first input data 2090, the first output data 2100 and "1" "0" of the first detection signal 2140 are outputted.

Since "1" "0" of the first detection signal 2140 is added to "0" "1" by the first adder 2220, the addition output 2260 becomes "1" "1" (indicating 3 in decimal).

Since "1" "1" of the addition output 2260 is inputted to the second processor 2020 and processed together with the second input data 2070, the second output data 2110 and "1" "1" of the second detection signal 2150 are outputted.

Since "1" "1" of the second detection signal 2150 is added to "0" "1" by the second adder 2230, the addition output 2270 becomes "0" "0" (indicating 3 in decimal).

Since "0" "0" of the addition output 2270 is inputted to the third processor 2030 and processed together with the third input data 2080, the third output data 2120 and "0" "0" of the third detection signal 2160 are outputted.

Since "0" "0" of the third detection signal 2160 is added to "0" "1" by the third adder 2240, the addition output 2280 becomes "0" "1" (indicating 1 in decimal).

Since "0" "1" of the addition output 2280 is inputted to the fourth processor 2040 and processed together with the fourth input data 2090, the fourth output data 2130 and "0" "1" of the fourth detection signal 2170 are outputted.

Since "0" "1" of the fourth detection signal 2170 is inputted to the first subtracter 2250 and "1" "0" is subtracted, the subtraction output 2290 becomes "0" "0" (indicating 0 in decimal).

Since "0" "0" of the subtraction output 2290 is inputted to the first processor 2010 and processed together with the first input data 2090, the first output data 2100 and "0" "0" of the first detection signal 2140 are outputted.

When the controller 2000 is structured so that "0" "1" (1 in decimal) is added to an output signal of the first failure detection signal of the first processor and the addition signal is inputted to the second processor, and "0" "1" (1 in decimal) is added to an output signal of the second failure detection signal and the addition signal is inputted to the third processor, and "0" "1" (1 in decimal) is added to an output signal of the third failure detection signal and the addition signal is inputted to the fourth processor, and "1" "0" (2 in decimal) is subtracted from an output signal of the fourth failure detection signal and the subtraction signal is inputted to the first processor, the failure detection signals of the processors become alternating signals which alternate with a fixed period when the units of the controller 2000 are normal.

In FIG. 23, an example of four processors is shown similar to FIG. 22. However, even if processors in an optional number are provided, it is desirable to connect them in the same way and there are no restrictions on the number of processors.

Figure 24:
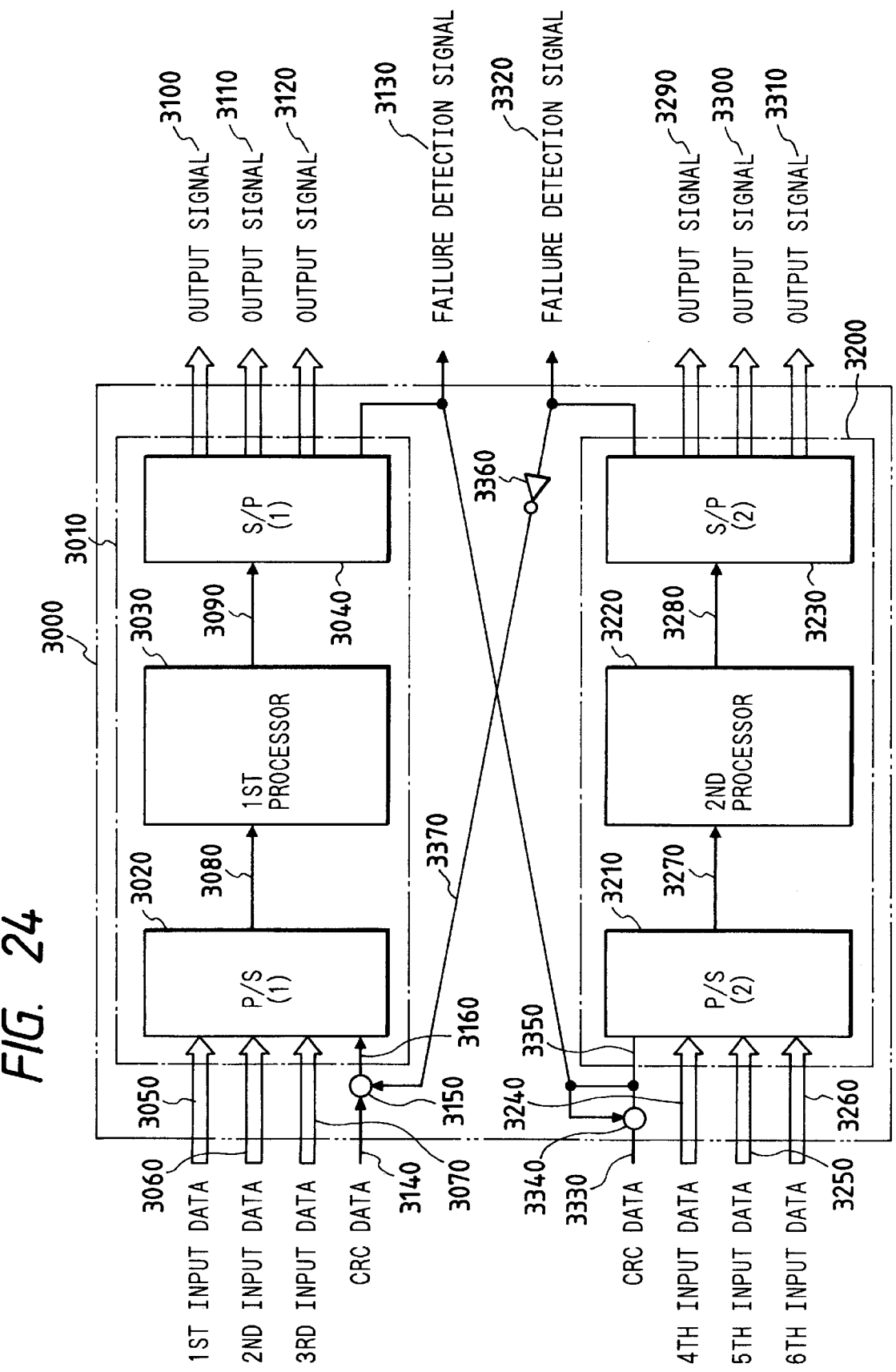
FIG. 24 is a schematic diagram of another embodiment of the present invention.

FIG. 24 shows another embodiment of the present invention. FIG. 24 is different from FIG. 21 in the processing method for the second detection signal. Namely, when the first input data 3050 is all inputted to the first control circuit 3010 in FIG. 24, the second input data 3060 is inputted next, and when the second input data 3060 is all inputted, the third input data 3070 is inputted next, and when the third input data 3070 is all inputted, CRC data 3140 for checking data is inputted next as a failure detection signal 3160 via a first adder 3150.

These data are converted sequentially to a serial signal 3080 by the parallel-serial converter 3020, inputted to the first processor 3030, processed as predetermined, and outputted as a serial signal 3090. This serial signal 3090 is converted to and outputted as an output signal 3100, an output signal 3110, and an output signal 3120, which are parallel with each other, by the serial-parallel converter 3040, so that another device is controlled, and furthermore the failure detection signal 3130 is outputted and inputted to the second adder 3340.

When the fourth input data 3240 is all inputted to the second control circuit 3200 in the same way, the fifth input data 3250 is inputted next, and when the fifth input data 3250 is all inputted, the sixth input data 3260 is inputted next, and when the sixth input data 3260 is all inputted, CRC data 3330 for checking data is inputted next as a failure detection signal 3350 via the second adder 3340.

These data are converted sequentially to a serial signal 3270 by the parallel-serial converter 3210, inputted to the second processor 3220, processed as predetermined, and outputted as a serial signal 3280. This serial signal 3280 is converted to and outputted as an output signal 3290, an output signal 3300, and an output signal 3310, which are parallel with each other, by the serial-parallel converter 3230, so that another device is controlled, and furthermore the failure detection signal 3320 is outputted and inverted in sign by the sign inverter 3350, and a sign inversion failure detection signal 3360 is inputted to the first adder 3150.

In the initial state, it is assumed that the output levels of the detection failure signal 3130 of the first control circuit 3010 and the detection failure signal 3320 of the second control circuit 3200 are L.

The L-level detection failure signal 3130 of the first control circuit 3010 is inputted to the second adder 3340 of the second control circuit 3200, but the CRC data 3330 will not be destroyed. In other words, the normal CRC data 3350 is inputted to the second serial-parallel converter 3210.

On the other hand, the output level of a sign inversion signal 3370 of the detection failure signal 3320 of the second control circuit 3200 is H. The H-level sign inversion signal 3370 is inputted to the first adder 3150 and operates to destroy the CRC data 3140. The destroyed CRC data 3160 is inputted to the first parallel-serial converter 3020, so that it is processed by the first processor 3030, and the H-level failure detection signal 3130 is outputted via the first serial-parallel converter 3040. This H-level failure detection signal 3130 is inputted to the second adder 3340, so that the CRC data 3330 is destroyed. The destroyed CRC data 3350 is inputted to the second parallel-serial converter 3210, so that it is processed by the second processor 3220, and the H-level failure detection signal 3320 is outputted via the second serial-parallel converter 3230. This H-level failure detection signal 3130 is inverted in sign by the sign inverter 3360 and an L-level signal is inputted to the first adder 3150. Namely, since the CRC data 3140 is not destroyed by the first processor 3150, the normal CRC data is inputted to the first parallel-serial converter. Thus, it is returned to the initial state and controlled.

As mentioned above, when all the units of the controller 3000 are normal, the failure detection signal 3130 and the failure detection signal 3320 are alternated with a fixed period.

With such a duplicated arrangement using each failure detection signal, the CRC data of the corresponding detector is switched, and only when all the data, circuits, and elements operate normally will an output signal for controlling the object to be controlled be outputted and when a failure is detected in a part, no output signal is outputted. Therefore, when a failure occurs, a fail safe function for controlling on the safe side is made possible.

According to the present invention, as mentioned above, a controller having an extremely high fail safe performance and a system using it can be realized.

Figure 25:
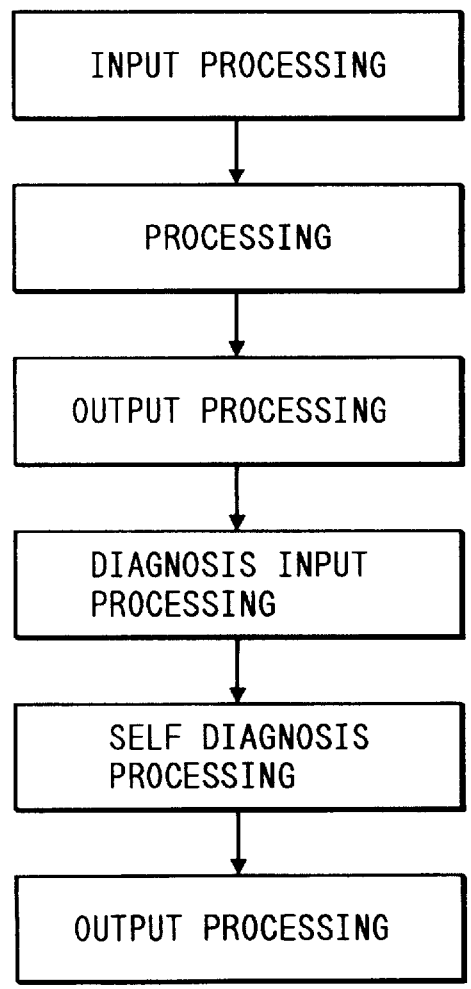
FIG. 25 is a flow diagram showing an example of programming in the present invention.

FIG. 25 shows an example of a program when the first processor and the second processor shown in FIGS. 21 and 24 comprise a microcomputer. The data processing is executed after the input process is executed and the output process is executed according to the result. When this process ends, the diagnosis process for detecting a failure starts. Namely, the failure diagnosis process is executed after the input process for detecting a failure is executed and when this process ends, the output process is executed. Namely, when an operation or data is normal, no signal is outputted. However, when it is abnormal, a signal is outputted and, for example, an emergency process is executed.

As mentioned above, according to the present invention, a normal operation and an abnormal operation of a controller comprising a plurality of processors or logic units can be detected with certainty.

The content of input data processed by each processor can be checked, so that not only a normal operation and an abnormal operation of the hardware, but also a normal operation and an abnormal operation of the software can be detected.

When the present invention is applied to an ATP device, control data for the two systems are generated from an ATP command speed signal, and each logic unit in the ATP device is duplicated so as to process each control data, and each system has at least two CRC data for checking the control data. By changing the opposite CRC data of each logic unit or selecting one of the two according to the content of a failure detection signal from each duplicated logic unit, checking of the control data and checking of the operation of each logic circuit can be realized.

What is claimed is:

1. A controller comprising
   a plurality of processors to which input signals are applied for outputting output signals obtained by executing a plurality of operations on said input signals, including a first processor among said plurality of processors which supplies an output signal to an input of one of a plurality of second processors and at least one other processor among said plurality of second processors which supplies an output signal to said first processor, and
   means for inverting the polarity of said output signal of said one other processor among said plurality of second processors being supplied as an input signal to said first processor.

2. A controller according to claim 1, wherein said first processor and said second processors are connected so that said first processor makes a closed signal loop via said plurality of second processors, and said polarity inverting means causes the polarity of a signal on said closed signal loop to be inverted.

3. A controller comprising
   a first processor to which an input signal is applied for outputting an output signal obtained by executing a plurality of operations on said input signal, and a second processor to which an input signal is applied for outputting an output signal obtained by executing a plurality of operations on said input signal, an output signal of said first processor being supplied to an input of said second processor, and
   means for supplying an output signal of said second processor to an input of said first processor with an inverted polarity with respect to that of said input signal to be inputted to said first processor.

4. A controller according to claim 3, wherein said first processor is connected to form a closed loop, via said second processor, in which closed loop the polarity of a signal is inverted.

5. A controller comprising a first serial converter for converting parallel input signals to a serial signal, a first processor for processing said serial signal of said first serial converter, a first parallel converter for converting a serial output signal of said first processor to parallel signals, a second serial converter for converting parallel input signals to a serial signal, a second processor for processing said serial signal of said second serial converter as an input signal, and a second parallel converter for converting a serial output signal of said second processor to parallel signals, means for supplying one of the output signals of said first parallel converter to said second serial converter as one of said parallel input signals thereto, and means including an inverter for supplying one of the output signals of said second parallel converter to said first serial converter to supply to said first serial converter a signal which is inverted in polarity with respect to that of other parallel input signals inputted to said first serial converter.

6. A controller according to claim 5, wherein, when said one of said parallel input signals inputted to said first serial converter from the output of said second parallel converter makes a closed loop via said second serial converter, said second processor, and said second parallel converter, the polarity thereof is inverted with respect to that of other parallel input signals inputted to said first serial converter.

7. A controller comprises, means for supplying a plurality of input signals in the form of a group of signals inputted in parallel, a first multiplexer and a second multiplexer for multiplexing said plurality of input signals to respective signals first and second output in time division, a first processor for processing said first output signal provided by said first multiplexer, a first demultiplexer for integrating parallel output signals of said first processor which are divided in time, a second processor for processing said second output signal provided by said second multiplexer, and a second demultiplexer for integrating parallel output signals of said second processor which are divided in times, and means for supplying one of the output signals of said first demultiplexer to said second multiplexer together with said plurality of input signals which are inputted in parallel, and means including an inverter for supplying one of the output signals of said second demultiplexer to said first multiplexer together with said plurality of input signals to supply to said first multiplexer a signal which is inverted in polarity with respect to that of other signals which are inputted to said first multiplexer.

8. A controller according to claim 7, wherein, when said one of input signals inputted to said first multiplexer from the output of said second demultiplexer makes a closed loop via said second multiplexer, said second processor, and said second demultiplexer, the polarity thereof is inverted with respect to that of other parallel input signals inputted to said first multiplexer.

9. A controller comprising a plurality of processors for executing a plurality of operations, an adder for adding an output signal of a first processor of said plurality of processors and an optional value, means for supplying input signals to said plurality of processors respectively, means for supplying an output signal of a second processor among said plurality of processors to an input of said first processor among said plurality of processors, means for supplying an output signal of said first processor to said adder, and means for supplying an output signal of said adder to an input of said second processor.

10. A controller comprising N processors, where N is a positive integer, for executing a plurality of operations, an adder for adding an output signal of the N=N of said N processors and an optional value, and means for supplying input signals to said N processors, an output signal of a N=1 processor among said N processors being supplied to a N=2 processor among said N processors, output signals of said N=2 processor being supplied to a N=3 processor, and output signals of each subsequent processor being supplied to a sequentially following processor, an output signal of said adder being supplied to said N=1 processor.

11. A controller comprising a first processor and a second processor for executing a plurality of operations, an adder for adding an output signal of said first processor and an optional value, a subtracter for subtracting an optional value from an output signal of said second processor, and means for supplying input signals to said first processor and said second processor respectively, an output signal of said adder being supplied as an input to said second processor, an output signal of said subtracter being supplied as an input to said first processor.

12. A controller comprising N processors, where N is a positive integer, for executing a plurality of operations, M adders, where M is a positive integer, for adding an output signal of a respective one of said N processors and an optional value, a subtracter for subtracting an optional value from an output signal a N=N processor of said N processors, and means for supplying input signals to each of said N processors, an output signal of a N=1 processor among said N processors being supplied to an M=1 adder among said M adders, an output signal of said M=1 adder being supplied to a N=2 processor among said N processors, an output signal of an N=2 processor among said N processors being supplied to an M=2 adder among said plurality of adders, an output signal of said M=2 adder being supplied to a N=3 processor among said processors, output signals of each subsequent processor being supplied to a sequentially following adder and outputs of each subsequent adder being supplied to a sequentially following processor, with an output of the N=N processing being supplied to said subtracter, and an output signal of said subtracter to said N=1 processor.

13. A controller comprising a first serial converter for converting a parallel input signal to a serial signal; a first processor for processing said serial signal of said first serial converter; a first parallel converter for converting a serial output signal of said first processor to a parallel signal; a second serial converter for converting a parallel input signal to a serial signal; a second processor for processing said serial signal of said second serial converter; a second parallel converter for converting a serial output signal of said second processor to a parallel signal; a first status discrimination signal for discriminating the statuses of said first serial converter, said first processor, and said first parallel converter; means for providing a second status discrimination signal for discriminating the statuses of said second serial converter, said second processor, and said second parallel converter; means for providing a first failure detection signal for indicating the statuses of said first serial converter, said first processor, and said first parallel converter in response to said first status discrimination signal; means for providing a second failure detection signal for indicating the statuses of said second serial converter, said second processor, and said second parallel converter in response to said second status discrimination signal; polarity inversion failure detection signal generating means for generating a polarity inversion failure detection signal by inverting the output polarity of said second failure detection signal; a first adder for adding said first status discrimination signal and said polarity inversion failure detection signal; and a second adder for adding second status discrimination signal and said first failure detection signal; an output signal of said first adder being supplied to said first serial converter together with said parallel input signal and an output signal of said second adder being supplied to said second serial converter together with said parallel input signal.

14. A controller comprising a first processor for outputting a first detection signal and a first output signal which is obtained by inputting and processing a first input signal and a polarity inversion detection signal; a second processor for outputting a second detection signal and a second output signal which is obtained by inputting and processing a second input signal and said first detection signal; a first connection for supplying said first detection signal to said second processor; and a second connection for supplying said polarity inversion detection signal of said second processor to said first processor; wherein said second processor outputs said second detection signal on the basis of said first detection signal inputted via said first connection, and said second connection outputs a polarity inversion detection signal, obtained by inverting the polarity of said second detection signal, to said first processor; and wherein said first processor outputs said first detection signal on the basis of said polarity inversion detection signal.

15. A controller according to claim 14, wherein said second connection includes a logic unit for inverting the polarity of said second detection signal outputted from said second processor.

16. A controller according to claim 14, wherein said second processor includes a logic unit for inverting the polarity of said second detection signal processed by said second processor on the basis of said first detection signal.

17. A controller according to one of claims 14 to 16, wherein said first input signal or said second input signal includes processing data for processing by said first processor to produce first and said second processor and check data for checking the operations of said first and second processors.

18. A controller according to claim 17, wherein the processing data of said first input signal is the same as that of said second input signal.

19. A controller according to claim 17, wherein said check data checks the content of said processing data.

20. A controller according to claim 17, wherein one of said first processor and said second processor has a logic unit for implementing logic for said first detection signal or said second detection signal and the check data of said first input signal or said second input signal.

21. An ATP device comprising a first logic unit, including a first failure detector for checking first control data including at least two kinds of CRC data according to an ATP command speed signal for instructing the speed of an electric motor vehicle using one of said CRC data and for outputting a first failure detection signal, a first frequency converter for converting said first control data to a first ATP command speed frequency signal, and a first frequency comparator for comparing a speed frequency signal which is proportional to a detected speed of said electric motor vehicle and said first ATP command speed frequency signal and for outputting a first output signal according to a deviation between said speed frequency signal and said first ATP command speed frequency signal; a second logic unit, including a second failure detector for checking second control data including at least two kinds of CRC data according to said ATP command speed signal using one of said CRC data and outputting a second failure detection signal, a second frequency converter for converting said second control data to a second ATP command speed frequency signal, and a second frequency comparator for comparing said speed frequency signal and said second ATP command speed frequency signal and for outputting a second output signal according to the deviation between said speed frequency signal and said second ATP command speed frequency signal; and a matcher for correlating said first output signal and said second output signal and outputting alternating signals; said CRC data of said second failure detector being changed by said first failure detection signal and said CRC data of said first failure detector being changed by said second failure detection signal.

22. An ATP device according to claim 21, wherein a first signal line for transmitting a signal for changing said CRC data of said second failure detector using said first failure detection signal is connected between the output side of said first failure detector and the input side of said second failure detector, and a second signal line for transmitting a signal for changing said CRC data of said first failure detector using said second failure detection signal is connected between the output side of said second failure detector and the input side of said first failure detector.

23. An ATP device according to claim 22, wherein one of said first signal line and said second signal line has a logic circuit for inverting said first failure detection signal or second failure detection signal.

24. An ATP device comprising a first microcomputer responsive to an ATP command speed signal for instructing the speed of an electric motor vehicle for generating first control data including at least two kinds of CRC data; a second microcomputer responsive to said ATP command speed signal for generating second control data including at least two kinds of CRC data; a first logic unit, including a first failure detector for checking said first control data inputted from said first microcomputer using one of said CRC data and for outputting a first failure detection signal, a first frequency converter for converting said first control data to an ATP command speed frequency signal, and a frequency comparator for comparing a speed frequency signal which is proportional to the speed of said electric motor vehicle and said ATP command speed frequency signal and for outputting a first output signal according to a deviation between said speed frequency signal and said ATP command speed frequency signal; a second logic unit, including a second failure detector for checking said second control data inputted from said second microcomputer using one of said CRC data and for outputting a second failure detection signal, a second frequency converter for converting said second control data to an ATP command speed frequency signal, and a frequency comparator for comparing said speed frequency signal of said electric motor vehicle and said ATP command speed frequency signal and for outputting a second output signal according to a deviation between said speed frequency signal and said ATP command speed frequency signal; and a matcher for correlating said first output signal and said second output signal and for outputting alternating signals; said CRC data of said second control data being changed by said first failure detection signal and said CRC data of said first control data being changed by said second failure detection signal.

25. An ATP device according to claim 24, wherein a first signal line for transmitting a signal for changing said CRC data of said second failure detector in response to said first failure detection signal is connected between the output side of said first detector and the input side of said second detector, and a second signal line for transmitting a signal for changing said CRC data of said first failure detector in response to said second failure detection signal is connected between the output side of said second detector and the input side of said first detector.

26. An ATP device according to claim 25, wherein one of said first signal line and said second signal line has a logic circuit for inverting said first failure detection signal or second failure detection signal.

27. An automatic train control system comprising a generator which is installed outside an electric motor vehicle for generating an ATP command speed signal for instructing the speed of said electric motor vehicle; a receiver which is installed inside said electric motor vehicle for receiving said ATP command speed signal from said generator; a speed detector which is installed inside said electric motor vehicle for detecting a speed of said electric motor vehicle and for generating a speed frequency signal in proportion to said speed; and an ATP device which is installed inside said electric motor vehicle for controlling the speed of said electric motor vehicle using said ATP command speed signal and said speed frequency signal; said ATP device comprising:

a first microcomputer responsive to said ATP command speed signal outputted from said receiver for generating first control data including at least two kinds of CRC data;

a second microcomputer responsive to said ATP command speed signal outputted from said receiver for generating second control data including at least two kinds of CRC data;

a first logic unit, including a first failure detector for checking said first control data inputted from said first microcomputer using one of said CRC data and for outputting a first failure detection signal, a first frequency converter for converting said first control data inputted from said first microcomputer to an ATP command speed frequency signal, and a frequency comparator for comparing said speed frequency signal and said ATP command speed frequency signal and for outputting a first output signal according to a deviation therebetween;

a second logic unit including, a second failure detector for checking said second control data inputted from said second microcomputer using one of said CRC data and for outputting a second failure detection signal, a second frequency converter for converting said second control data inputted from said second microcomputer to an ATP command speed frequency signal, and a frequency comparator for comparing said speed frequency signal and said ATP command speed frequency signal and for outputting a second output signal according to the deviation therebetween; and a matcher connected to receive said first failure detection signal, said first output signal, said second failure detection signal, and said second output signal, for correlating said first output signal and said second output signal on the basis of said first and second failure detection signals, and for outputting alternating signals in which said first output signal and said second output signal alternate; and a braking device which is installed inside said electric motor vehicle and which is responsive to said alternating signals, for controlling a braking force applied to said electric motor vehicle;

said CRC data of said second failure detector being changed by said first failure detection signal and said CRC data of said first failure detector being changed by said second failure detection signal.

28. An automatic train control system according to claim 27, wherein a first signal line for transmitting a signal for changing said CRC data of said second failure detector in response to said first failure detection signal is connected between the output side of said first detector and the input side of said second detector, and a second signal line for transmitting a signal for changing said CRC data of said first failure detector in response to said second failure detection signal is connected between the output side of said second detector and the input side of said first detector.

29. An automatic train control system according to claim 28, wherein one of said first signal line and said second signal line has a logic circuit for inverting said first detection signal or second detection signal.

30. An ATP device comprising: a first microcomputer responsive to an ATP command speed signal for instructing the speed of an electric motor vehicle and for generating first control data together with first CRC data and second control data together with second CRC data; a second microcomputer for generating third control data together with third CRC data and fourth control data together with fourth CRC data; a first logic unit, including a first memory for storing said first control data outputted from said first microcomputer, a second memory for storing said second control data, a first switching circuit for switching said first memory and said second memory, a first failure detector and a second failure detector for checking output data of said first switching circuit, a first adder for adding said output data of said first switching circuit and an output signal of said second failure detector, a second adder for adding a speed frequency signal which is proportional to a speed of said electric motor vehicle and an output signal of said first failure detector, a first frequency converter for converting an output signal of said first adder to an ATP command speed frequency signal, and a first frequency comparator for comparing an output signal of said second adder and an output signal of said first frequency converter and for outputting a first output signal and a first failure detection signal according to a deviation therebetween; a second logic unit, including a third memory for storing said third control data outputted from said second microcomputer, a fourth memory for storing said fourth control data, a second switching circuit for switching said third memory and said fourth memory, a third failure detector and a fourth failure detector for checking output data of said second switching circuit, a third adder for adding said output data of said second switching circuit and an output signal of said fourth failure detector, a fourth adder for adding a speed frequency signal which is proportional to a speed of said electric motor vehicle and an output signal of said third failure detector, a second frequency converter for converting an output signal of said third adder to an ATP command speed frequency signal, and a second frequency comparator for comparing an output signal of said fourth adder and an output signal of said second frequency converter and for outputting a second output signal and a second failure detection signal according to a deviation therebetween; and a matcher for correlating said first output signal of said first logic unit, said second output signal of said second logic unit, said first failure detection signal, and said second detection signal, respectively, and for outputting alternating signals, wherein said first failure detection signal controls said second switching circuit and switches said third control data and said fourth control data, and wherein said second failure detection signal controls said first switching circuit said first switching circuit and switches said first control data and said second control data.

31. An ATP device according to claim 30, wherein a logic circuit is provided for inverting the polarity of one of said second detection signal for controlling said first switching circuit and said first detection signal for controlling said second switching circuit.

32. An ATP device according to claim 30, wherein said first microcomputer generates said first control data, said first CRC data for said first control data and said second CRC data for said first control data when said ATP command speed signal for instructing the speed of an electric motor vehicle is inputted, and said second microcomputer generates said second control data, said third CRC data for said second control data and said fourth CRC data for said second control data when said ATP command speed signal for instructing the speed of an electric motor vehicle is inputted, and an output signal of said first adder for adding said first control data and said first CRC data and an output signal of said second adder for adding said first control data and said second CRC data are inputted to said first switching circuit, and an output signal of said third adder for adding said second control data and said third CRC data and an output signal of said fourth adder for adding said second control data and said fourth CRC data are inputted to said first switching circuit.

33. An ATP device according to claim 30, wherein said first microcomputer generates said first control data together with said first CRC data and said second CRC data when said ATP command speed signal for instructing the speed of an electric motor vehicle is inputted, and said second microcomputer generates said second control data together with said third CRC data and said fourth CRC data when said ATP command speed signal for instructing the speed of an electric motor vehicle is inputted, and said first control data outputted from said first microcomputer is stored in said first memory, and an output signal of said first memory is inputted to said first failure detector, said second failure detector and said first adder, said second control data outputted from said second microcomputer is stored in said second memory, and an output signal of said second memory is inputted to said third failure detector, said fourth failure detector and said third adder, and wherein said second switching circuit switches said third CRC data and said fourth CRC data in response to said first failure detection signal, and wherein said first switching circuit switches said first CRC data and said second CRC data in response to said second failure detection signal.

34. An ATP device according to claim 30, wherein said first microcomputer generates first data, said first CRC data and said second CRC data when said ATP command speed signal for instructing the speed of an electric motor vehicle is inputted, and said second microcomputer generates second data, said third CRC data and said fourth CRC data when said ATP command speed signal for instructing the speed of an electric motor vehicle is inputted, and said first CRC data and said second CRC data are inputted to said first switching circuit, and an output signal of said first switching circuit and said first data are added in a fifth adder, and said third CRC data and said fourth CRC data are inputted to said second switching circuit, and an output signal of said first switching circuit and said first data are added in a sixth adder, and an output signal of said fifth adder is inputted to said first adder, said first failure detector and said second failure detector, and an output signal of said sixth adder is inputted to said sixth adder, said third failure detector and said fourth failure detector.

35. A controller according to one of claims 1, 3, 5, 7, 9, 10–14, 21, 24, 27 and 30, wherein said processors comprise microcomputers for executing an accident diagnosis processing operation periodically after a parallel input signal is processed.

36. A controller according to one of claims 1, 3, 5, 7, 9, 10–14, 21, 24, 27 and 30, wherein said input signal, said output signal, and said failure detection signal are alternating signals which alternate when said plurality of processors are all normal.

37. A controller according to one of claims 24, 27, and 30, wherein said matcher correlates said first output signal, said second output signal, said first failure detection signal and said second failure detection signal, and when said first and second output signals do not match with each other and said first and second failure detection signals do not match with each other, the alternation of said failure detection signals is stopped, and an emergency brake signal is outputted to said electric motor vehicle in response to the stopping of the alternation when said first and second failure detection signals do not match with each other.

* * * * *